(12) United States Patent
Ivanov

(10) Patent No.: US 9,766,733 B2
(45) Date of Patent: Sep. 19, 2017

(54) TFT DISPLAY, OLED INTERFACE AND METHOD FOR DETECTING THE SPATIAL POSITION OF EXTREMITIES IN A SPATIAL REGION LOCATED IN FRONT OF THE DISPLAY

(75) Inventor: Artem Ivanov, Landshut (DE)

(73) Assignee: MICROCHIP TECHNOLOGY GERMANY GMBH, Gilching (DE)

( * ) Notice: Subject to any disclaimer, the term of this patent is extended or adjusted under 35 U.S.C. 154(b) by 52 days.

(21) Appl. No.: 13/641,172

(22) PCT Filed: Apr. 18, 2011

(86) PCT No.: PCT/EP2011/001962
§ 371 (c)(1),
(2), (4) Date: Mar. 20, 2013

(87) PCT Pub. No.: WO2011/128116
PCT Pub. Date: Oct. 20, 2011

(65) Prior Publication Data
US 2013/0194519 A1 Aug. 1, 2013

(30) Foreign Application Priority Data

Apr. 16, 2010 (DE) .................. 10 2010 015 524
Apr. 1, 2011 (DE) .................. 10 2011 015 806

(51) Int. Cl.
*G06F 3/041* (2006.01)
*G02F 1/1333* (2006.01)
*G06F 3/044* (2006.01)

(52) U.S. Cl.
CPC ........ *G06F 3/0412* (2013.01); *G02F 1/13338* (2013.01); *G06F 3/044* (2013.01)

(58) Field of Classification Search
CPC ........ G06F 3/0412; G06F 3/044; G06F 3/041; G06F 3/0416; G06F 2203/04111; G02F 1/13338; H03K 17/962
(Continued)

(56) References Cited

U.S. PATENT DOCUMENTS 5,043,710 A 8/1991 Rydel .................. 345/174
6,900,458 B2 * 5/2005 Tung et al. ................ 257/40
(Continued)

FOREIGN PATENT DOCUMENTS

CN 101059738 A 10/2007 ............ G06F 3/044
CN 101251667 A 8/2008 ............ G02F 1/133
(Continued)

OTHER PUBLICATIONS

International Search Report, Application No. PCT/EP2011/001962, 10 pages, Jan. 17, 2012.
(Continued)

*Primary Examiner* — Peter D McLoone
(74) *Attorney, Agent, or Firm* — Slayden Grubert Beard PLLC

(57) ABSTRACT

A liquid crystal display (LCD) includes a plurality of display units formed with a first substrate, a color matrix formed on the first substrate, and a common electrode formed on the color matrix, a second substrate spaced from the first substrate, a pixel electrode matrix formed on the second substrate, a liquid crystal material disposed between the common electrode and the pixel electrode matrix. The LCD includes a touch sensing member integrated onto the color matrix of the first substrate.

31 Claims, 12 Drawing Sheets

(58) Field of Classification Search
USPC .................. 345/104, 173, 174, 156; 349/12; 341/33; 178/18.01
See application file for complete search history.

(56) References Cited

U.S. PATENT DOCUMENTS

| | | | |
|---|---|---|---|
| 7,924,350 B2 * | 4/2011 | Ma et al. ......................... | 349/12 |
| 7,990,482 B2 * | 8/2011 | Shinohara ....................... | 349/12 |
| 8,054,300 B2 * | 11/2011 | Bernstein ....................... | 345/174 |
| 8,115,499 B2 * | 2/2012 | Osoinach et al. ............ | 324/686 |
| 8,552,989 B2 * | 10/2013 | Hotelling et al. ............ | 345/173 |
| 8,610,688 B2 * | 12/2013 | Hristov et al. ................ | 345/173 |
| 8,704,779 B2 * | 4/2014 | Hristov et al. ................ | 345/173 |
| 8,743,083 B2 * | 6/2014 | Zanone et al. ................ | 345/174 |
| 2008/0062139 A1 * | 3/2008 | Hotelling et al. ............ | 345/173 |
| 2009/0096760 A1 | 4/2009 | Ma et al. ...................... | 345/174 |
| 2009/0185088 A1 * | 7/2009 | Shinohara ..................... | 349/12 |
| 2009/0309851 A1 * | 12/2009 | Bernstein ...................... | 345/174 |
| 2010/0066650 A1 | 3/2010 | Lee et al. ....................... | 345/64 |
| 2010/0102941 A1 | 4/2010 | Richter et al. ............. | 340/407.2 |
| 2010/0164889 A1 * | 7/2010 | Hristov et al. ................ | 345/173 |
| 2010/0182018 A1 | 7/2010 | Hazelden et al. ............ | 324/663 |
| 2010/0289765 A1 * | 11/2010 | Noguchi et al. ............. | 345/173 |
| 2010/0295559 A1 * | 11/2010 | Osoinach ....................... | 324/658 |
| 2010/0321621 A1 * | 12/2010 | Kikuchi et al. ............... | 349/122 |
| 2010/0328226 A1 * | 12/2010 | Simmons .............. | G06F 3/0418 345/173 |
| 2011/0007021 A1 * | 1/2011 | Bernstein et al. ............ | 345/174 |
| 2011/0128254 A1 * | 6/2011 | Teranishi et al. ............. | 345/174 |
| 2011/0193809 A1 * | 8/2011 | Walley et al. ................ | 345/173 |
| 2011/0210939 A1 * | 9/2011 | Reynolds .............. | G06F 3/0418 345/174 |
| 2012/0050180 A1 * | 3/2012 | King et al. ..................... | 345/173 |
| 2012/0127124 A1 * | 5/2012 | Zanone et al. ................ | 345/174 |
| 2012/0169401 A1 * | 7/2012 | Hristov et al. ................ | 327/517 |
| 2013/0106702 A1 * | 5/2013 | Chen et al. .................... | 345/168 |
| 2013/0265276 A1 * | 10/2013 | Obeidat et al. ............... | 345/174 |
| 2013/0307823 A1 * | 11/2013 | Grivna et al. ................. | 345/174 |
| 2014/0225850 A1 * | 8/2014 | Hristov et al. ................ | 345/173 |
| 2014/0347317 A1 * | 11/2014 | Tanaka .......................... | 345/174 |
| 2014/0362042 A1 * | 12/2014 | Noguchi et al. .............. | 345/174 |

FOREIGN PATENT DOCUMENTS

| | | | |
|---|---|---|---|
| CN | 101493594 A | 7/2009 | ............ G02F 1/133 |
| CN | 101632059 A | 1/2010 | ............ G06F 3/044 |
| WO | 2005/036510 A1 | 4/2005 | ............ G02F 1/133 |
| WO | 2008/116642 A2 | 10/2008 | ............ G06F 3/01 |
| WO | 2011/128116 A2 | 10/2011 | ............ G06F 3/044 |

OTHER PUBLICATIONS

International Preliminary Report on Patentability, Application No. PCT/EP2011/001962, 14 pages, Oct. 16, 2012.
Chinese Office Action, Application No. 201180019032.0, 6 pages, Apr. 14, 2016.
Chinese Office Action, Application No. 201180019032.0, 26 pages, dated Feb. 11, 2015.
Korean Office Action, Application No. 20127028665, 8 pages, dated Jul. 18, 2017.

* cited by examiner

TFT DISPLAY, OLED INTERFACE AND METHOD FOR DETECTING THE SPATIAL POSITION OF EXTREMITIES IN A SPATIAL REGION LOCATED IN FRONT OF THE DISPLAY

CROSS-REFERENCE TO RELATED APPLICATIONS

This application is a U.S. National Stage Application of International Application No. PCT/EP2011/001962 filed Apr. 18, 2011, which designates the United States of America, and claims priority to German Application No. 10 2010 015 524.1 filed Apr. 16, 2010 and German Application No. 10 2010 015 806.5 filed Apr. 1, 2011, the contents of which are hereby incorporated by reference in their entirety.

TECHNICAL FIELD

The invention relates to a TFT liquid crystal display, which as such serves to display image contents, which are generated by a digital computer system, wherein in the range of this display an input device is provided that allows to carry out input operations in a contactless manner via gesture-like interaction by using field electric interaction effects.

BACKGROUND

Known from WO 2008/116642 A2 of the same applicant is a mobile cell phone that has a display for visualizing a user interface, wherein this mobile cell phone is provided with an electrode arrangement by means of which the position of a finger of a user may be detected in a region spatially in front of the display. The electrode arrangement comprises several measurement electrodes, wherein by means of these measurement electrodes voltages may be detected, the level of which closely correlates with the spatial position of the finger with respect to the mobile cell phone. The position of the finger may be calculated on the basis of a triangulation method or a trilateration method using these voltage levels. By means of the continuously determined positions of the finger a cursor or menu control and thereby a function control of the mobile cell phone may be carried out.

SUMMARY

According to various embodiments, solutions can be provided by means of which it becomes feasible to implement in devices, which as such are provided with a display, an input interface for input operations in a particularly advantageous manner, wherein these input operations are carried out contactless in the form of finger or hand movements in a region located in front of the display.

According to the various embodiments, a LC display may comprise a polarization layer, a first substrate layer, a first electrode structure that comprises a plurality of pixel electrodes and is applied to the first substrate layer, a liquid crystal layer, and a second electrode structure that is formed as a whole-area transparent electrode layer (VCOM) and functions as a counter electrode for the plurality of pixel electrodes, wherein the LC display is provided with a sensor device for detecting the finger or the hand of a user in a region located in front of the LC display, wherein the above mentioned second electrode structure functions as field providing electrode of this sensor device.

BRIEF DESCRIPTION OF THE DRAWINGS

Further details and characteristics result from the following description in connection with the drawing.

DETAILED DESCRIPTION

Figure 1:
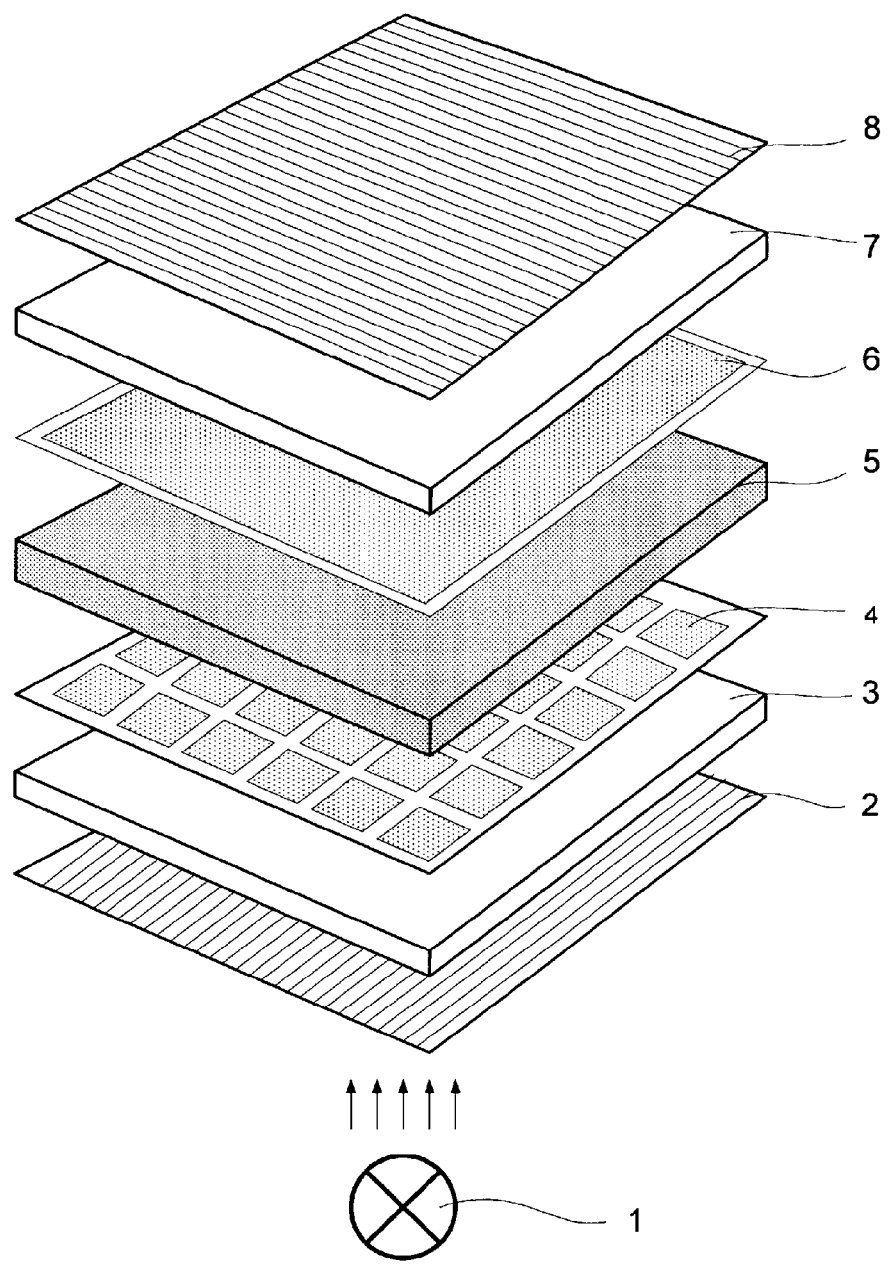
FIG. 1 shows a schematic view for illustrating the multi-layer construction of a display as well as the positioning of a continuous electrode structure used as a field-providing electrode of a sensor system.

By means of the concept according to various embodiments a sensor circuitry is created comprising the TFT LC display, which allows for a detection of object positions in front of a TFT LC display in a capacitive manner. The concept according to various embodiments in particular qualifies for a gesture based control of devices which comprise a TFT LC display, as for example computers, vending machines, mobile phones and the like and allows for detecting the position of the hand or of the finger of the user in front of the display by directly using a transparent electrode of the TFT LC display as field providing electrode. By means of the concept according to various embodiments, solved is the up to now existing problem that the propagation of the measurement field is affected by the components of the LC display and thereby the position detection of the finger in field electric manner is hindered. In a further advantageous manner it is avoided by means of the concept according to various embodiments that as a result of the operation of the display the field to date generated by means of separate field providing electrodes is affected. By means of the concept according to various embodiments it becomes feasible to use the electrode already included in the TFT LC display for the position detection system.

By means of the concept according to various embodiments it is rendered possible to form a gesture sensor system directly integrated into a TFT LC display that has a good operating range. The electronics provided for realizing the sensor system according to various embodiments in an advantageous manner may be implemented in a graphics controller chip. This graphics controller chip then preferably comprises several, for example, four inputs for connecting measurement electrodes. The connection of the measurement electrodes to the inputs of the graphics controller chip preferably is carried out by means of shielded measurement lines. The graphics controller chip may be configured such that its signal processing characteristics may be adjusted. The shielded lines must not be formed as individually shielded cables. For example, if applicable, they also may be integrated into an only single-layered printed circuit board or a flexible foil printed circuit board.

Preferably, the sensor device at least partially circuitrywise is integrated into a display operating circuitry. The sensor device may be carried out such that it comprises at least one edge electrode, which is arranged in an edge region adjacent to the second electrode structure. The sensor device also may comprise several edge electrodes. By means of this measure it is rendered possible, on the basis of the signals tapped from the individual measurement electrodes, to carry out a position determination of the finger or of the hand of a user by means of a triangulation approach.

Preferably, the display device is configured as a rectangular display. The sensor system preferably comprises several edge electrodes that are located in the edge and/or corner region of the rectangular display. The second electrode structure (VCOM) preferably is loaded with a square wave voltage. The frequency of the square wave voltage preferably is in the range of 50 Hz to 80 kHz. The second electrode structure, if applicable, may be sub-divided into different segments. The second electrode structure further also may form a functional electrode of a touch sensor system.

The concept according to various embodiments may be implemented such that the voltage applied to the common electrode by means of the display controller circuitry directly serves the generation of the field.

According to further embodiments, a display device may comprise an OLED light source as well as an OLED interface.

According to further embodiments, an OLED interface may be used in display devices, in particular those of mobile communications devices, as well as may be used as a background lighting structure for switching function interaction zones in electric devices, for example backlit operating bezels.

OLEDs up to now used as illumination means typically are constructed of several organic layers. In doing so, for the most part, a hole transport layer, HTL, consisting of indium tin oxide (ITO) is applied to the anode, which is arranged on a glass panel. Dependent on the production method often a layer of PEDOT/PSS (poly(3,4-ethylendioxythiophen)/polystyrolsulfonat) is applied between ITO and HTL, which serves to lower the injection barrier for holes and prevents the diffusion of indium into the junction. Applied to the HTL is a layer, which either includes a colorant (approximately 5 to 10%) or—rarely—completely consists of the colorant (for example aluminium-tris(8-hydroxychinolin), Alq3). This layer is labeled as emitter layer, EL. Thereto then an electron transport layer, ETL, is applied. To complete, a cathode consisting of a metal or an alloy with low electron work function, as for example calcium, aluminum, barium, ruthenium, magnesia silver alloy, is vacuum-deposited in full vacuum. As a protective layer and for reducing the injection barrier for electrons in most cases a very thin layer of lithium fluoride, cesium fluoride or silver is vacuum-deposited between the cathode and the ETL. The electrons (=negative charge) are injected by the cathode, while the anode provides the holes (=positive charge). Hole and electron drift towards each other and in an ideal case meet in the EL, for which reason this layer also is known as recombination layer. Electrons and holes form a bound state, which is known as exciton. Dependent on the mechanism the exciton already constitutes the excited state of the colorant molecule, or the collapse of the exciton provides the energy for exciting the colorant molecule. This colorant has different excited states. The excited state may pass into the basic state and in doing so emit a photon. The color of the emitted light depends on the energy distance between excited and basic state and selectively may be changed by variation of the colorant molecules. To date non-emitting triplet states are a problem. These may again be solved by addition of so-called excitors. For organic LEDs manufactured from polymers the abbreviation PLED (polymer light emitting diode) has been established. OLEDs manufactured from small molecules are labeled as SOLED or SMOLED. Often used as colorants in PLEDs are derivatives of poly(p-phenylen-vinylen) (PPV). Recently, colorant molecules are used, which lead to a four times higher efficiency to be expect than that with the above described fluorescent molecules. Metal-organic complexes are used in these more efficient OLEDs, in which the light emission is carried out from triplet states (phosphorescence). These molecules also are known as triplet emitters; by the way, the colorant may be excited by light, which may result in luminescence. It is a goal to produce self-illuminating displays, which use the organic electroluminescence. One advantage of OLED displays over conventional liquid crystal displays is the very high contrast, since they function without background illumination. While LCDs only act as colored filters, OLEDs emit colored light. This method is considerably more efficient, whereby OLEDs consume less energy. For this reason, OLED TV devices produce less heat than LC displays, in which a large portion of the energy required for the background illumination is converted to heat. On the basis of the low energy consumption, OLEDs may well be used in small mobile devices, for example notebooks, cell phones and MP3 players. Based on the not required background illumination it is feasible to construct OLEDs in a very thin manner. OLED displays and OLED TV devices, due to the small volume and the significantly lower weight, also have advantages over current LCD and plasma devices concerning transport costs. Furthermore it is known from a publication of the Fraunhofer Institute to construct an OLED panel element such that it may be switched on and off by contacting it.

Therefore, according to various embodiments, solutions can be created by means of which in connection with OLED structures an interaction zone may be implemented, which provides particularly advantageous interaction functions.

According to various embodiments the above mentioned goal is reached by an OLED interface, comprising:
a panel layer,
an anode electrode layer,
a cathode electrode layer, an organic illuminant layer structure, which is accommodated between the anode electrode layer and the cathode electrode layer, and an evaluation circuitry, wherein the evaluation circuitry is configured such that in cooperation with at least the anode electrode layer and/or the cathode electrode layer a sensor system is implemented for detecting a finger or a hand of a user in a region located in front of the panel layer without or before he/she touches the OLED interface or a panel element covering the OLED interface.

In doing so, it becomes feasible in an advantageous manner to implement a user interface using an OLED structure that allows to detect the movement of a finger or a hand of a user in a region located in front of the OLED structure by means of electrostatic and field electric effects, respectively, and, in doing so, to utilize at least one electrode system of the OLED structure. The position or movement information detected via the evaluation circuitry may be used for generating mouse control signals or for generating other switching and control signals.

In particular it is feasible, by means of the spatial detection of the movement or position of a finger of the user with respect to the OLED structure, to also carry out control actions, which directly relate to the functionality of the OLED structure. For example, the detected movement may be used to recognize gestures, which coordinate a switching on, a switching off and a brightness control without having to contact the OLED structure or a device accommodating the OLED structure physically.

Together with a LCD or TFT structure the OLED structure may form a display device. It is feasible to use one of the electrode layers of the OLED structure—preferably the anode electrode layer—as VCOM electrode of the LCD or TFT structure.

According to various embodiments, the anode electrode layer, the cathode electrode layer, or—in a combination of the OLED structure with a TFT structure—a further electrode layer provided on the TFT structure and here on a side opposite to the OLED structure is subdivided into a plurality of electrode segments such that these electrode segments form a segment array that comprises segment rows and segment columns. The evaluation circuitry is coupled with the electrode segments and configured such that it may take a switching state, in which a position detection at contacting is carried out via the electrode segments of the electrode layer, and further may take a switching state, in which the contactless position or movement detection of a finger of the user in a region located in front of the OLED structure may be carried out.

Furthermore, the evaluation circuitry may be configured such that by means of it a portion of the electrode segments, which are utilized for detecting the position of the finger of the user in touch mode, also are used for detecting in the non-touch mode, wherein the contactless position or movement detection is carried out by combining several electrode segments of the segment array into an electrode group.

In doing so it becomes feasible in an advantageous manner to implement a display device in connection with the OLED structure, wherein at least a part of the electrodes of the OLED structure is used for implementing a sensor system that serves a detection of the spatial positions or movements of the hand or of the finger of a user with respect to the OLED structure.

Temporarily the electrode segments may be operated as an electrode system by means of which a detection of the position or movement of a finger of the user is carried out before the user contacts the OLED structure. As soon as contact to the OLED structure or to a physical component of a display or illuminating device comprising the OLED structure is carried out, a position analysis in the touch mode may be carried out by means of directly adjacent electrode segments or adjacent electrode segments of rows and columns crossing each other. The electrode group preferably comprises electrode segments that form an elongated chain in the OLED interface. The chains used for detecting the position of the finger in the non-touch mode preferably extend relatively close along the edge region of the OLED structure or the display device comprising the OLED structure. The segment chains temporarily operated as sensor electrode systems for position or movement detection may have different orientations with respect to each other, in particular may be aligned parallel to each other and spaced from each other. Included into the position determination also may be evaluation results that are based on detection results, which have been collected from electrode segment chains that are aligned crosswise with respect to each other, in particular are aligned perpendicular with respect to each other.

The detection of the position of a finger at contacting the OLED structure or a display device comprising the OLED structure may be carried out by detecting and evaluating the field electric coupling of two directly adjacent electrode segments. In order to detect this short field electric coupling of the adjacent electrode segments the segment array preferably is constructed such that a first subset of the electrode segments is combined into separate segment rows and a second subset again is combined into separate segment columns. The segment rows and the segment columns are isolated against each other. The connecting links between consecutive electrode segments of the respective electrode segment row are isolated against the connecting links of the consecutive electrode segments of the segment columns. The respective cross-over points are configured as isolating bridges by means of which a galvanic connection of these connecting links in the cross-over segment is prevented. The electrode array preferably is designed in the form of a field comprising closely neighboring rhombi, hexagons, polygons or other close meshed adjacent parcels. Therefore, located adjacent to an electrode segment, which forms a component part of a segment column, in direct vicinity is an electrode segment, which forms a component part of a segment row. The contact point of the OLED structure or of a display comprising the OLED structure thereby corresponds to the cross-over point of that segment row and that segment column, which causes the highest capacitive coupling. The determination of the x and y positions in the touch detection mode therefore is carried out by detecting the cross-over points having high capacitive coupling. The contact position in the touch mode further also may be detected by determining which segment row and which segment column may have the highest capacitive coupling with the finger of the user. The contact position then corresponds to the cross-over point of this segment row with that segment column. However, in the non-touch mode the determination of the x and y positions is carried out by detecting the respective position dependent signal levels for the capacitive coupling of several segment columns and several segment rows, which are indicative for the distance of the finger from the respective segment row and the respective segment column. Then, from these level values the position of the finger may be calculated, or at least the course of movement of the finger may be described. This calculation preferably is carried out by processing several approaches, preferably weighted among each other, for example triangulation and trilateration approaches that are adjusted for different electrode segment groups and group combinations. The capacitive coupling to ground or another voltage injection are detected as an analog level via the segment rows and segment columns. This analog level then is converted by means of an ADC system and is subjected to a digital data processing.

In a particularly embodiment the position or movement determination in a substantially rectangular OLED structure or a display device comprising an OLED structure is carried out in the non-touch mode using the segment rows and segment columns located close to the edge. In doing so these segment rows and segment columns located close to the edge form an electrode frame. This electrode frame allows to detect the x position of the finger of a user by evaluating the finger influenced capacitive coupling of the close to the edge located segment columns to ground or against a potential of an electrode of the OLED structure.

The y position of the finger may be determined by means of the capacitive coupling, influenced by the finger, of the upper and the lower horizontal segment row to ground or against a potential of an electrode of the OLED structure. The counter potential to ground preferably may be applied to the anode electrode functioning as electrode layer of the OLED structure that substantially extends across the whole surface area on a backside of the panel layer opposite to the user, i.e. on the backside of the electrode segment array opposite to the user.

Preferably, the switching between a first switching state and a second switching state is carried out by means of a multiplexer device. This multiplexer device may be designed as a time multiplexer device that provides a certain time phase for the non-touch mode and a certain time phase for the touch mode. If applicable, certain groups of electrode segments also may be used in a program controlled manner and continuously as electrode segment chains for the position and movement detection in the non-touch mode and parallel thereto certain electrode segment chains may be used for a two-dimensional position detection in the touch mode. The user interface then preferably is formed such that it does not require a touch detection function for those regions whose electrode segment chains are used for non-touch position determination.

The touch detection mode and the non-touch detection mode may be carried out in temporal sequence by means of circuitry-wise measures or may exist simultaneously. In a sequential activation, instead of a fixed definition of the duration of the respective mode, the switching between the respective modes may be adjusted such that, for example, the clock portion for taking the second operating state (of the non-touch mode) is set to zero or is reduced as long as a contact is detected. Preferably, a contact is detected when the capacitive coupling of an electrode segment row and an electrode segment column with each other, or in each case to ground, exceeds a certain threshold value. By means of suppressing the non-touch analysis mode the signal processing may be simplified, since the signal evaluation in the touch mode may be carried out with lesser sensitivity and simpler evaluation operations than in the non-touch mode. Analogously, the clock portion for taking the first operating state is reduced in an advantageous manner as long as no contact is detected. Since the contacting action may be recognized particularly reliable, however, preferably even when, for example, no contacting indicative threshold value criteria fulfilling approach is detected, a contact detection is carried out in certain, however preferably relatively large time intervals to thereby accomplish a gain of functional safety.

In an advantageous manner, the non-touch mode may be sub-divided into at least two sub-modes. The first sub-mode is a large distance mode. In this mode, for example, only a wake-up function and a coarse detection of a z axis distance (distance substantially perpendicular to the display) is carried out. Only when falling below a minimum distance in z direction a processing of a second sub-mode is carried out. In this second sub-mode a more sensitive position determination is carried out by evaluating the coupling of the electrode group formed by the electrode segments to ground or evaluating a field coupled into this electrode group. The limit distance at which a detection of the x, y and z position is carried out when it is undercut, for example, corresponds to a distance at which the segment rows and segment columns located close to the edge already allow for a sufficiently exact position determination. According to experimental examinations these prerequisites are given regularly when the distance of the finger to the display is smaller than approximately ⅔ of the display diagonal.

In connection with the second switching state different electrode segment groups may be activated consecutively when a minimum distance is undercut. The electrode segment rows and electrode segment columns used for position detection in the non-touch mode thereby may "wander" in the display and in doing so take optimum detection positions for the respective position of the finger. Also, several electrode segment rows and electrode segment columns may be activated and evaluated at the same time. In doing so, the simultaneously activated electrode segment groups may be rows and columns, respectively, spaced from each other or also rows and columns aligned cross-wise with respect to each other. For medium distances, i.e. distances of 25% to 50% of the display diagonal the position of the finger may be determined by triangulatation and trilateration, in particular by means of evaluating the analog signal level of the segment rows and segment columns located close to the edge. During further approach the position of the finger may be determined as the cross-over point of the segment column and segment row with the highest capacitive coupling to ground, or otherwise significant levels of potential preferably of the OLED-electrodes. The z distance then may be determined from the respective level of the capacitive coupling to ground and the level of potential, respectively.

The cross-over point concept and the trilateration concept also may be combined, in particular combined in a weighted manner, and used for position determination.

Preferably, in the second switching state, i.e. in the non-touch mode, a first electrode group is activated which constitutes an upper horizontal segment chain located close to the edge and a second electrode group is activated, which constitutes a lower horizontal segment chain located close to the edge. By means of these two electrode segment groups then the y position of the finger lying between these horizontal limits may be calculated.

For a detection of the x position in the second switching state (non-touch mode) preferably electrode groups are used, which constitute a left vertical segment chain located close to the edge and a right vertical segment chain located close to the edge.

Furthermore it is feasible to use successively changing electrode groups for detecting the finger positions, so that, for example, the respective evaluated electrode segment groups wander across the OLED interface, in particular the OLED-display device, in a manner of an adaptively switched, for example vertically wandering row or horizontal wandering column.

Furthermore, the level values of electrode segment chains aligned to each other cross-wise, in particular aligned to each other approximately perpendicular, may be evaluated by means of respective evaluation concepts.

The detection of the x, y and z information preferably takes place, as already mentioned in the context of the second switching state (non-touch mode), by forming electrode groups and the coupling of these electrode groups to ground is detected. This respective coupling closely correlates with the distance of the finger from the respective electrode group. From these respective coupling values to ground, or by means of another potential coupling caused by the finger of the user and correlating with the distance of the finger, then the distance from the respective electrode group may be detected and the position of the finger may be determined from the different distance information.

As an example, the evaluation circuitry may be designed as an ASIC and may be arranged in close proximity to the panel layer of the OLED structure. The connection of the evaluation circuitry to the discrete conductor paths of the electrode segments, for example, may be carried out by means of a flexible conductor path, by means of clip contact structures or also by means of direct positioning of the ASIC on the panel layer. The electrode segments arranged on the panel layer are connected to the ASIC via conductor segments. Already in the region of the panel layer vertical and horizontal electrode segments may be combined to electrode rows and electrode columns, wherein these columns and rows are isolated against each other and as electrode segment group are individually connected with the ASIC or a multiplexer.

Preferably, the electrode segments are constructed as circular discs, as rhombi, hexagons, octagons, sickle shaped structures or closely adjacent other polygons, or in part have intermeshing geometries (for example a so-called bone or paving stone contour). In the design as respective segments, in particular rhombi, rhomb chains may be formed. A part of the rhombi is used to design horizontal rhomb chains, the remaining part of the rhombi is used for forming vertical rhomb chains. Between the electrode segments extend thin spacer gaps, which prevent a galvanic contact between the segments of an electrode segment row and the electrode segments of the crossing electrode segment columns. This way the electrode segments are configured in a densely packed manner, wherein only the electrode segments that compose a row-like or column-like chain are conductively connected to each other.

Internally the ASIC preferably is constructed such that it adjusts the wiring of the electrode segment rows and the electrode segment columns such that it may be used for processing the touch mode as well as also the processing of the non-touch mode. Preferably, an adjustment is provided for in the ASIC, which allows for taking into account certain system characteristics of the electrode groups as well as transition phenomena when changing between the working modes or the variation of the group design such that these are compensated in a sufficient manner.

In particular for devices being grasped with one hand, as for example cell phones, it is feasible to process a calibration routine in the context of the signal processing by means of which a field interference caused by grasping the device is compensated at least to a large extent. The gesture detection in the non-touch mode initially may require a certain gesture, for example a clockwise movement of the fingertip along an imaginary circular path that is carried out in front of the display in a distance of approximately 66% of the display diagonal. By means of this specific gesture the non-touch detection mode may be activated and in addition a calibration of the sensor technology may be carried out.

Preferably, a display correlating with the detected position is carried out via the user interface. The sliding movement of certain windows or menu items in the graphic user interface may be communicated acoustically and preferably also haptic by means of a mechanical feedback device, for example an electromagnetically displaced mass element.

Insofar as an approach of the finger also is combined with a touch-down onto the OLED display, the positions determined in the non-touch approaching phase may be compared with the contact position then detected in the touch mode. By means of an implemented internal calibration procedure the evaluation parameters for consecutive detection actions may be adapted by means of the information initially collected in the non-touch phase and by means of the position information extremely reliably collected in the touch mode. The same is also true for lifting the finger from the display device. Here, by means of the last uniquely determined contact position an automatic internal fine adjustment by means of respective modification of internal parameters may be carried out for the position determination in the non-touch mode.

In particular in touchscreens of relatively small format the position detection may be carried out such that with a larger distance of the finger from the display device the detection range for detecting the position of the finger has larger dimensions as the display device.

The processing of the x and y positions, in particular in direction y, may be carried out such that an offset is generated here, which results in that the cursor currently positioned in the display or the selected menu item is not covered by the finger of the user.

To be understood as interface or display contact in the context of the present description is a light touchdown of the finger onto an OLED panel structure, in particular a display panel. In this connection, the electrode systems incorporated into the OLED interface are not or at least not imperatively galvanically contacted. Insofar, the finger rests on an isolating panel or film or foil element. Typically, all electrode systems intended in the OLED interface are covered by an isolating transparent glass or plastic layer. The contacting state may be detected by means of sufficiently indicative signal levels.

The touch state and the non-touch state also may be detected by means of special dynamic characteristics coming along with the z axis distance. This way, the z dynamics typically is close to zero at touchdown of the finger or represents the flattening of the fingertip with increasing touchdown pressure. This phenomenon may be used as selection indicator. Also the z dynamics and certain z dynamics criteria may be used in the non-touch mode as selection indicator. A z dynamics criterion, for example, may be defined such that it is met by a quick lowering and again lifting of the fingertip along a short distance approximately perpendicular to the display. This z dynamics criterion then describes a "virtual mouse click".

Depending on whether a touch mode or a non-touch mode is active the user interface may vary and in this connection have characteristics that provide special handling advantages for the respective mode. For example, in the non-touch mode, if applicable, there may be provided a coarser graphical menu item structure or a somewhat slower or more sluggish cursor dynamics than in touch mode.

According to various embodiments it is also feasible to activate the electrode segment chains aligned cross-wise and lengthwise such that a multi-point detection, in particular a detection of two fingers is allowed for. For example, to do so several zones may be generated, which each provide values for finger positions. The activation of this multi point detection mode may be dependent on fulfilling certain distance criteria or also on certain initially required curves, i.e. gestures. In the context of a multi point detection mode intuitively advantageously coordinable interactions may be coordinated as for example scaling operations, rotations of image contents and drag and drop actions, without the display being touched in this connection.

According to a further embodiment, a backlit touchpad component comprises a carrier layer, an OLED structure and an electrode layer, which is bound to the carrier layer.

The electrode layer is sub-divided into a plurality of electrode segments, wherein these electrode segments in this connection form a segment array that comprises segment rows and segment columns. The touchpad component illuminated by the OLED structure further comprises an evaluation circuitry that is configured such that it may take a switching state, in which a contact detection is carried out by means of the electrode segments of the electrode layer. In addition the evaluation circuitry allows for taking a switching state in which a contactless position or movement detection of a finger of the user may be carried out in a region located in front of the touchpad component. The contactless position or movement detection occurs by combining several electrode segments of the segment array into a row or column-like electrode segment group. This touchpad component may be constructed and designed as described above with respect to the display device.

This touchpad component may be used to implement touchpads, which in addition also allow for contactless position detection.

Such touchpads may be incorporated in installation locations so far commonly used for touchpads, for example in notebooks. The structure according to various embodiments for combined detection of finger positions in the touch mode as well as in the non-touch mode also may be incorporated into other devices, in particular furniture and vehicle compartment equipment to implement in a spatially limited region a respective input zone, i.e. an input zone that also allows for non-touch interactions.

According to an embodiment, a LC display may comprise a first substrate layer, a first electrode structure, which comprises a plurality of pixel electrodes and is applied to the first substrate layer, a liquid crystal filling, and a second electrode structure that is designed as a whole area electrode layer and functions as counter electrode for the plurality of pixel electrodes, wherein the LC display is provided with a sensor device for detecting the finger or the hand of a user in a region located in front of the LC display, and wherein the second electrode structure functions as field providing electrode of this sensor device.

According to a further embodiment, the sensor device circuitry-wise at least partially may be embedded into a display operating circuitry. According to a further embodiment, the sensor device at least may comprise one edge electrode functioning as measurement electrode, which is arranged in an edge region adjacent to the second electrode structure. According to a further embodiment, the sensor device may comprise several edge electrodes functioning as measurement electrodes. According to a further embodiment, the display device may be configured as a rectangular display, and that it comprises several edge electrodes, which are located in the edge and/or corner region of the rectangular display. According to a further embodiment, the second electrode structure can be loaded with a square wave, trapezoidal or similar alternating voltage. According to a further embodiment, the frequency of the square wave voltage can be in the range of 50 Hz to 80 kHz.

According to another embodiment, a sensor circuitry for detecting the presence and/or position of extremities in a region spatially located in front of a LC display may comprise several measurement electrodes; a field-providing electrode for generating a field which takes effect onto the measurement electrodes in dependence of the presence or position of the above mentioned extremities, and an evaluation circuitry for detecting field electric effects onto these measurement electrodes, wherein the field-providing electrode is implemented using a VCOM electrode of the LC display.

According to yet another embodiment, in a method for detecting the spatial position of extremities in a detection range that extends in front of a TFT LC display, an electric field is generated by means of a field providing electrode and voltage levels are detected by means of measurement electrodes that are affected by the spatial position of the extremities to be detected, wherein as field providing electrode a laminar electrode is used, which forms a component part of the LC system of the TFT LC displays.

According to a further embodiment of the above method, the TFT LC display can be operated by a square wave alternating voltage applied to the laminar electrode. According to a further embodiment of the above method, the voltage at the laminar electrode can be in the range of 5V. According to a further embodiment of the above method, the measurement electrodes can be designed transparent and are placed above the VCOM electrode.

According to yet another embodiment, an OLED interface may comprise a panel layer, an anode electrode layer, a cathode electrode layer, an organic illuminant layer structure that is accommodated between the anode electrode layer and the cathode electrode layer, and an evaluation circuitry, wherein the evaluation circuitry is designed and connected such that in cooperation with at least the anode electrode layer and/or the cathode electrode layer a sensor system is implemented for detecting a finger or a hand of a user in a region in front of the panel layer without or before these contact the OLED interface or a panel element covering that.

According to a further embodiment of the OLED interface, the position determination can be accomplished by evaluating voltage levels, wherein these voltage levels are measured between one of the electrode layers and a sensor electrode device. According to a further embodiment of the OLED interface, the position determination can be accomplished by evaluating voltage levels, wherein these voltage levels are measured between the anode electrode layer and a sensor electrode device.

According to yet another embodiment, an OLED interface may comprise a panel layer, an OLED layer structure, and a transparent electrode layer, which is bound to the panel layer, wherein this electrode layer is subdivided into a plurality of electrode segments and these electrode segments form a segment array that comprises segment rows and segment columns, an evaluation circuitry that is configured such that with its help a contactless position or movement detection of a finger of the user may be accomplished in a region located in front of the panel layer, wherein the contactless position or movement detection is carried out by combining several electrode segments of the segment array into a row-like or column-like electrode segment group.

According to a further embodiment of the above OLED interface, the evaluation circuitry can be configured such that it may take a switching state in which a contact detection is carried out via the electrode segments of the electrode layer. According to a further embodiment of the above OLED interface, switching between the switching state for position detection at contacting and the switching state for position or movement detection without contact can be accomplished by means of a multiplexer device. According to a further embodiment of the above OLED interface, the clock portion for taking the operating state for position or movement detection without contact can be set to zero or is reduced as long as a contact is detected. According to a further embodiment of the above OLED interface, the clock portion for taking the operating state for position determination at interface contact can be reduced as long as no contact is detected. According to a further embodiment of the above OLED interface, in the switching state destined for position or movement detection without contact at first a rough approach detection can be carried out, and that only in the case of detection of a sufficiently pronounced approach state a more sensitive position determination is carried out. According to a further embodiment of the above OLED interface, in the context of the switching state destined for position or movement detection without contact, the electrode segment groups function are changed as sensor electrodes. According to a further embodiment of the above OLED interface, in the context of the switching state destined for position or movement detection without contact, for determining a y position an electrode segment group can be activated, which constitutes an upper horizontal segment chain and/or that in the context of the switching state destined for position or movement detection without contact for determining a y position an electrode segment group is activated, which constitutes a lower horizontal segment chain. According to a further embodiment of the above OLED interface, in the context of the switching state destined for position or movement detection without contact, for determining an x position an electrode segment group can be activated, which constitutes a left vertical segment chain. According to a further embodiment of the above OLED interface, in the context of the switching state destined for position or movement detection without contact, for determining a x position an electrode segment group can be activated, which constitutes a right vertical segment chain. According to a further embodiment of the above OLED interface, in the context of the switching state destined for position or movement detection without contact, for determining x and y positions, level values can be used, which are collected from electrode segment groups arranged transverse with respect to each other, in particular perpendicular to each other. According to a further embodiment of the above OLED interface, the electrode segment groups used for detecting the position of the finger in the non-touch mode can be interchanged adaptively, for example in a successive manner such that the respective active electrode segment group wanders across the interface in the form of a moving row or a moving column. According to a further embodiment of the above OLED interface, in the context of the switching state destined for position or movement detection without contact in each case two electrode segment groups can be formed and the capacitive coupling of these two electrode segment groups is detected, and the approaching state is determined from this capacitive coupling.

According to yet another embodiment, an OLED interface may comprise a carrier layer, an electrode layer that is bound to the carrier layer, and an OLED function layer, wherein the electrode layer is subdivided into a plurality of electrode segments and these electrode segments form a segment array that comprises segment rows and segment columns, an evaluation circuitry that is designed such that it may take a switching state in which a contact detection is carried out via the electrode segments of the electrode layer, and may take a switching state in which a contactless position or movement detection of a finger of the user may be carried out in a region located in front of the OLED interface, wherein the contactless position or movement detection is carried out by combining several electrode segments of the segment array into a row-like or column-like electrode segment group.

According to yet another embodiment, in a method for generating input signals in the context of the movement of a finger of a user on a touchpad component, wherein this touchpad component comprises an OLED layer structure, a carrier layer, and an electrode layer that is bound to the carrier layer, wherein that electrode layer is subdivided into a plurality of electrode segments and these electrode segments form a segment array that comprises segment rows and segment columns, the evaluation of the signals detected via the segment rows and segment columns is carried out by means of an evaluation circuitry that is designed such that it may take a switching state in which a contact detection is carried out via the electrode segments of the electrode layer, and may take a further switching state in which a contactless position or movement detection of a finger of the user may be carried out in a region located in front of the touchpad component, wherein the contactless position or movement detection is carried out by combining several electrode segments of the segment array into a row-like or column-like electrode segment group.

Illustrated in FIG. 1 in the form of a perspective illustration is the design of a LC display (liquid crystal display). Such LC displays have a multi layer design. The light emitted from the illumination source 1 passes through a polarizer layer 2. A structure consisting of conductive transparent electrodes 4 is applied to a glass substrate 3 lying above. In a TFT (Thin-Film Transistor) LC display also the transistors are integrated into this layer. The individual electrodes constitute the pixels of the display. In the color displays three electrodes belong to one pixel. The counter electrode 6 for the liquid crystal filling 5 in the TFT displays lies above on the second substrate 7 and is constructed continuously. This electrode 6 is labeled as "common electrode". Its electric potential is labeled as VCOM. Further, located on the substrate 7 of color displays are color filters. At the top an analyzer layer is arranged (second polarizer 8, which with its polarization axis is aligned perpendicular with respect to the first polarizer 2).

When a voltage is present between the pixel electrodes 4 and the VCOM electrode 6 the polarization of the light changes at passing through the liquid crystal layer. For this reason the illuminating power of a pixel depends on the electrode voltage.

There are two variants of activating the TFT panel: with VCOM as DC voltage and with VCOM as AC voltage. In the second case, VCOM typically has a square wave form comprising an amplitude of approximately 5 V and a frequency of approximately 60 Hz (when activated with "frame inversion") to approximately 50 kHz (when activated with "line inversion"). Commonly, this frequency is in the range of 5 kHz to 40 kHz.

The common electrode 6 is the outermost electrically conductive layer of the display, it is formed continuously and covers the complete display surface.

According to various embodiments this VCOM layer 6 is operated in an AC operating mode and at least partially is used as a generator or field providing electrode.

In this solution concept the display, in particular its VCOM electrode 6, becomes a component of the gesture sensor and no longer functions as a source of interference, but generates the generator signal.

As long as the VCOM signal has a relatively low frequency nevertheless by means of a particular sampling logic a relatively high operating range and stability of the sensor system may be accomplished. For this it may be proceeded as will be described in more detail in the following. It is particularly advantageous when sensor circuitry provided for detecting and pre-evaluation of the voltages present at the measurement electrodes, i.e. the "GestIC-electronics", is directly integrated into the display controller.

Figure 2:
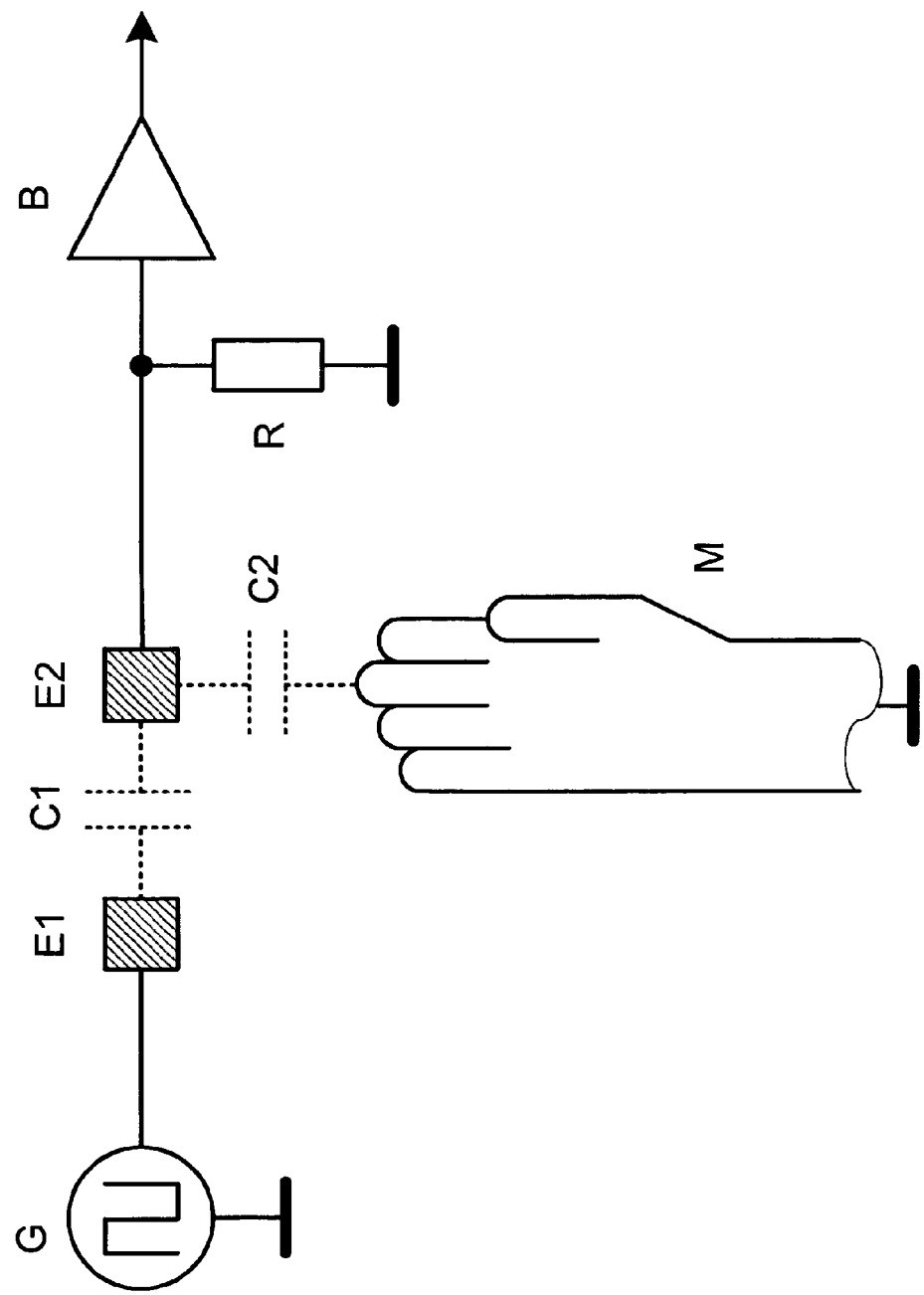
FIG. 2 shows a schematic view of an input circuitry of the measurement system (GestIC electronics)

In FIG. 2 the input stage of the sensor circuitry according to various embodiments is illustrated in its basic design. The electrode E1 shown here is composed of the VCOM electrode (FIG. 1 reference numeral 6) of the display. The VCOM signal is present at this electrode E1. By means of the hand M of a user that is located in a region in front of the TFT LC display a manipulation of the voltage present at the measurement electrode E2 is carried out. This voltage may be detected by the measurement circuitry B, R that is illustrated here in a simplified manner. This detected voltage closely correlates with the spatial position of the hand M with respect to the two electrodes E1, E2. By using several measurement electrodes E2 in the vicinity of the VCOM electrode E1 it is allowed for to use the measured voltage levels in an triangulation approach and to calculate in this manner the position of the hand with respect to the measurement electrodes E2. The respective signals may be used for a menu or cursor control that preferably is graphically supported by the image content depicted by means of the display.

As further can be seen from FIG. 2 the generator electrode E1 is operated using a square wave voltage from generator G. The measurement electrode E2 (only one measurement electrode is shown here) is in capacitive coupling with E1 and the object M to be detected. The respective capacities are labeled as C1 and C2. The voltage at E2 is detected by a buffer B with the high impedance input (shown as equivalent resistance R) and is fed to the further circuitry components. The input circuitry here has low-pass characteristics. The values of C1 and C2 and R, respectively, for practical applications may have approximately 1-10 pF and 10 MOhms, respectively.

Figure 3:
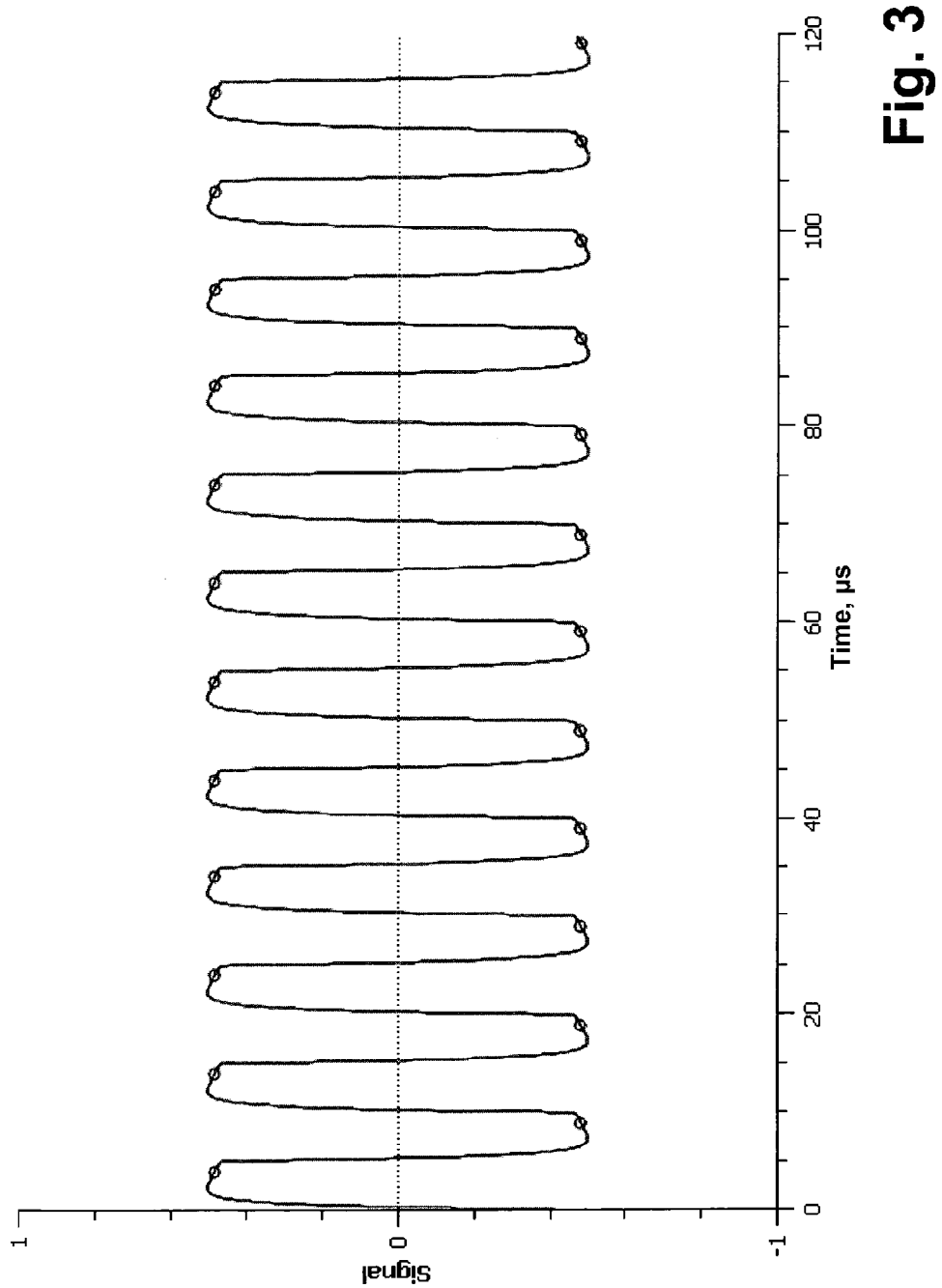
FIG. 3 shows a typical temporal course of the voltage level at a selected measurement electrode.
Figure 4:
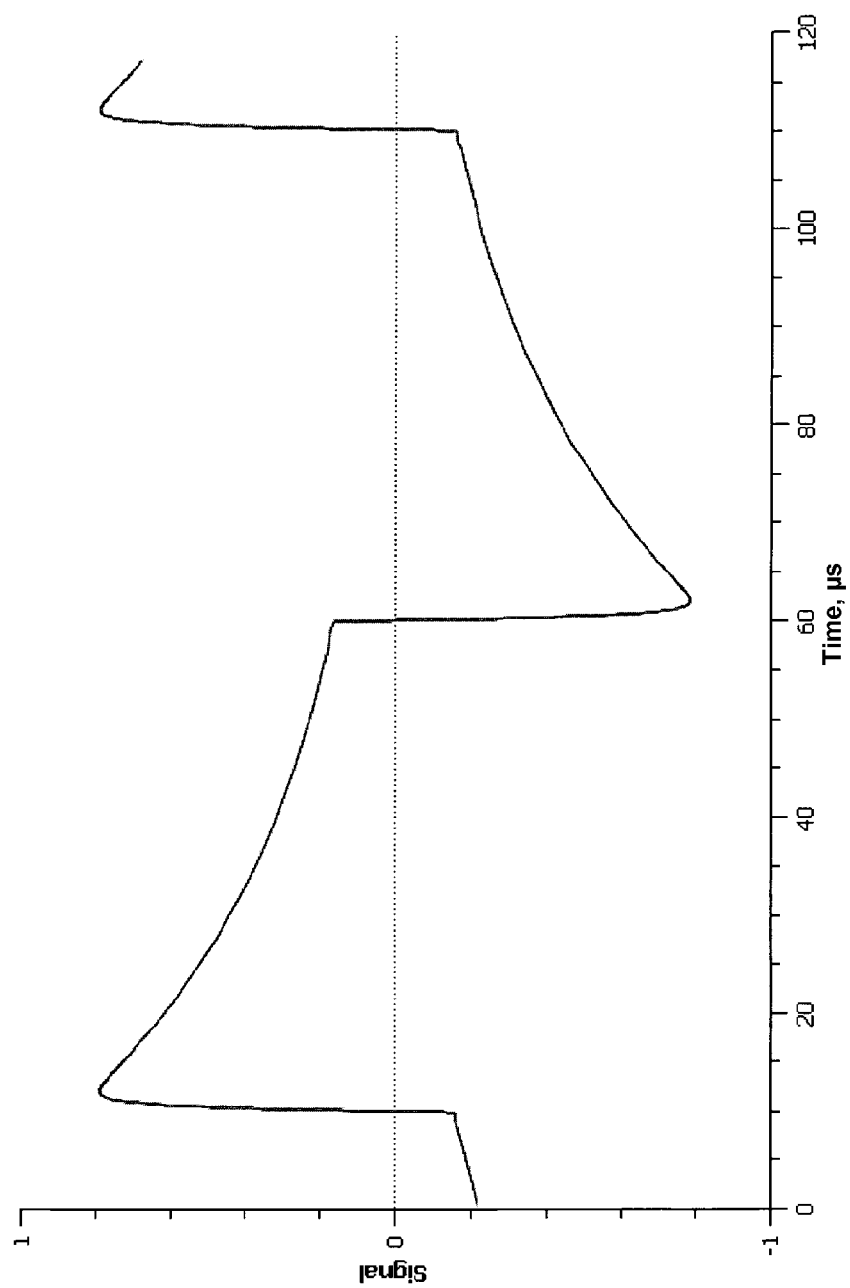
FIG. 4 shows a graph for illustrating the temporal course of the voltage level at a selected measurement electrode at a working frequency of 10 kHz.

Shown in FIG. 3 is the voltage characteristic at a selected measurement electrode (electrode E2 in FIG. 2) for a working frequency of 100 kHz, the small circular symbols on the curve indicate the sampling points during the signal measurement as it is implemented in the GestIC electronics. As can be seen from FIG. 3 the amplitude of the signal voltage is lower at the sampling point than immediately after the slope. This is influenced by the mentioned low-pass characteristics of the input stage. This effect becomes increasingly larger at low working frequencies. Depicted in FIG. 4 is the signal characteristic for the working frequency of 10 kHz. In order to counteract a signal reduction during reducing the working frequency an alternative sampling logic may be used, which takes advantage of the presence of higher frequency components in the square wave signal.

Figure 5:
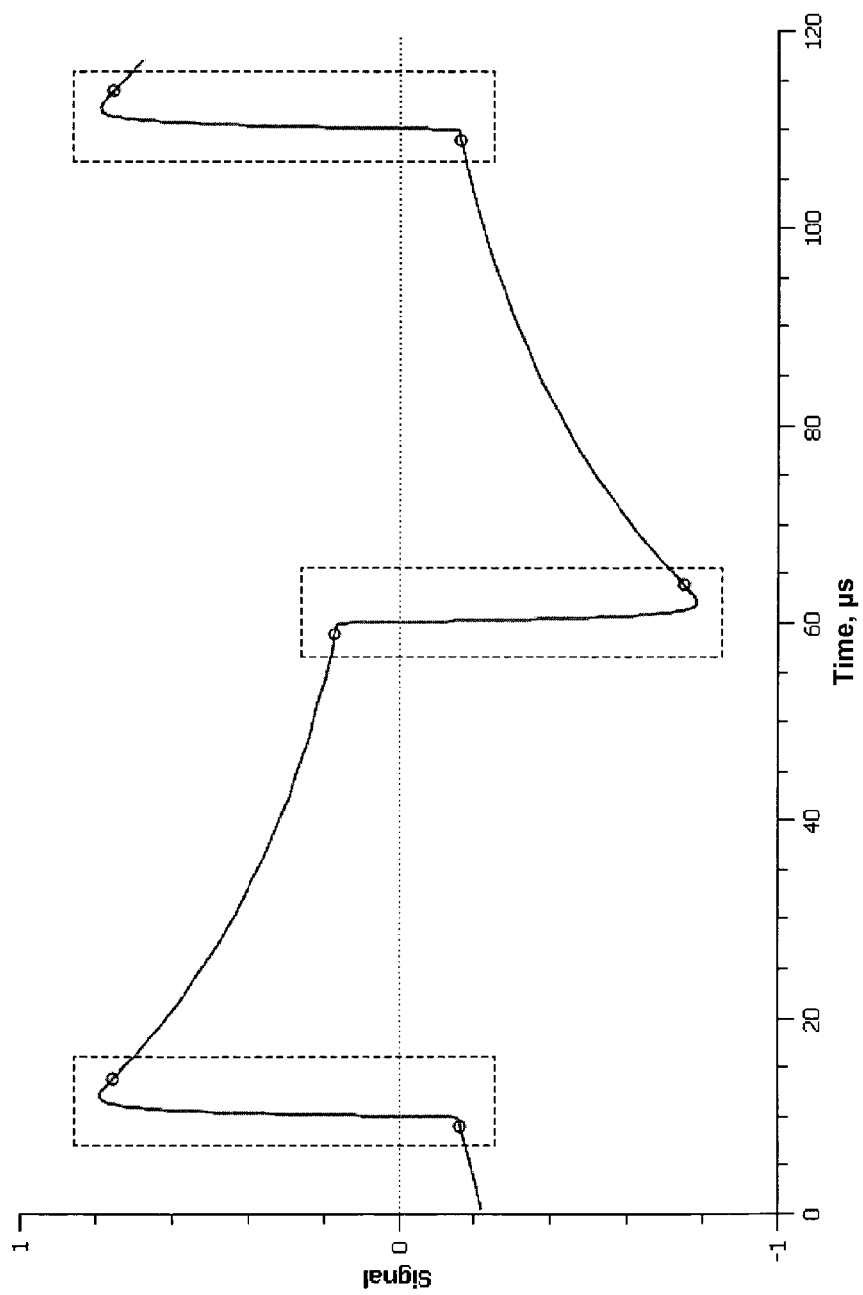
FIG. 5 shows a graph similar to FIG. 4 for illustrating an evaluation concept according to which the amplitude of each edge of the generator signal (VCOM) individually is measured with two sampling points.

Illustrated in FIG. 5 is a measurement concept according to which the signal amplitude at the measurement electrode is measured individually with two sampling points at each slope of the generator signal (VCOM).

With lower requirements for the position resolution of the LC display according to various embodiments it further may be operated with only one sampling point per slope.

Figure 6:
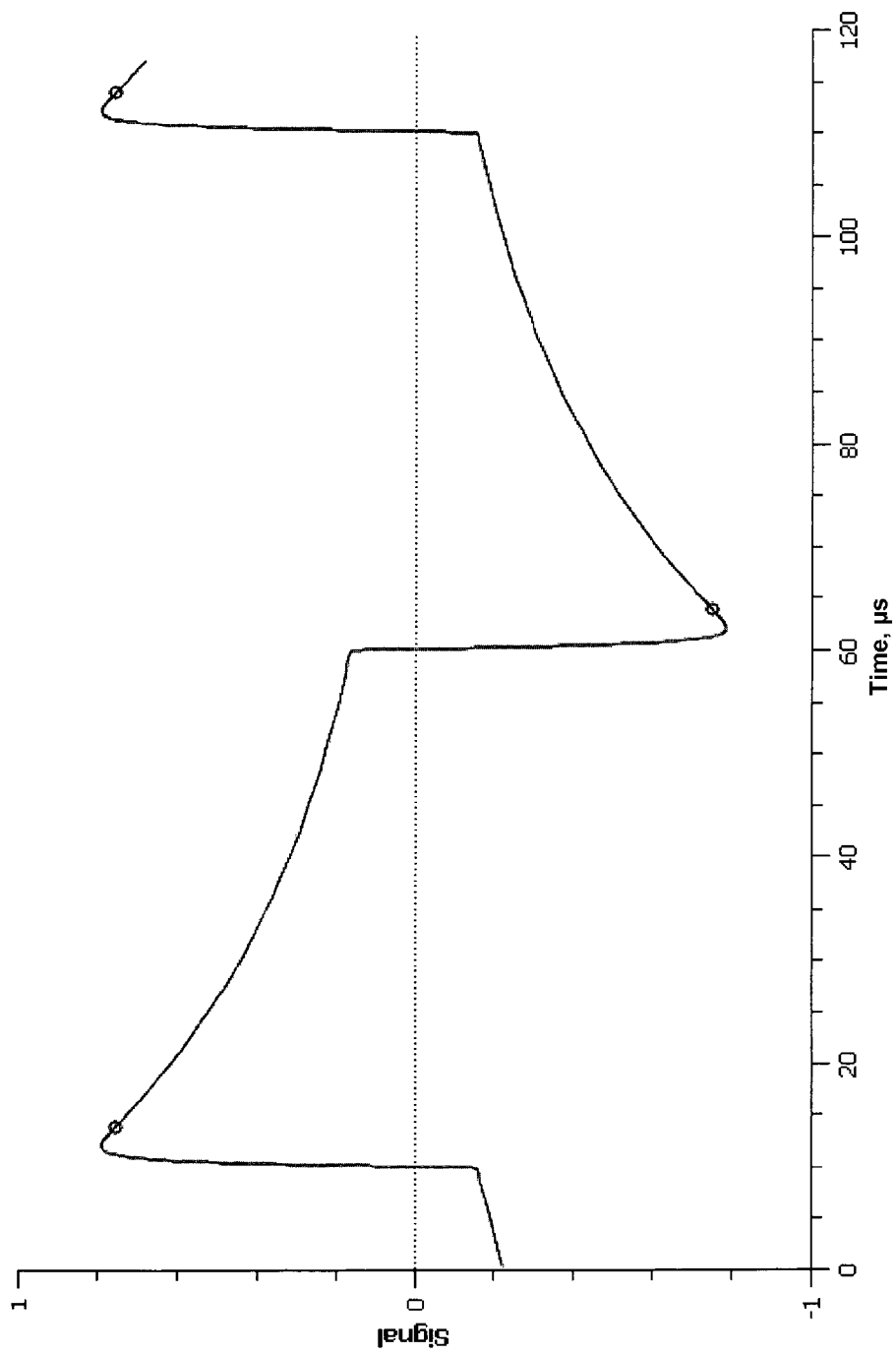
FIG. 6 shows a graph also similar to FIG. 4 for illustrating a further evaluation concept according to that in each case only one sampling point is set immediately following the edge.

Then, the sampling point preferably is positioned immediately after the slope as is illustrated in FIG. 6. It is assumed that the sampling only requires a short amount of time (around 1 µs) and the signal voltage may be assumed to be quasi constant during the sampling process.

By means of the concept according to various embodiments, besides the cost reduction by omitting an additional electrode, a particularly high range results without changes to the display and its activation. Furthermore, the concept according to various embodiments may be implemented without additional shielding measures for the display and for this reason also does not impair the brightness of the display. The circuitry for detecting and evaluating the voltages at the measurement electrodes in an advantageous manner may be directly integrated into a display controller.

Figure 7:
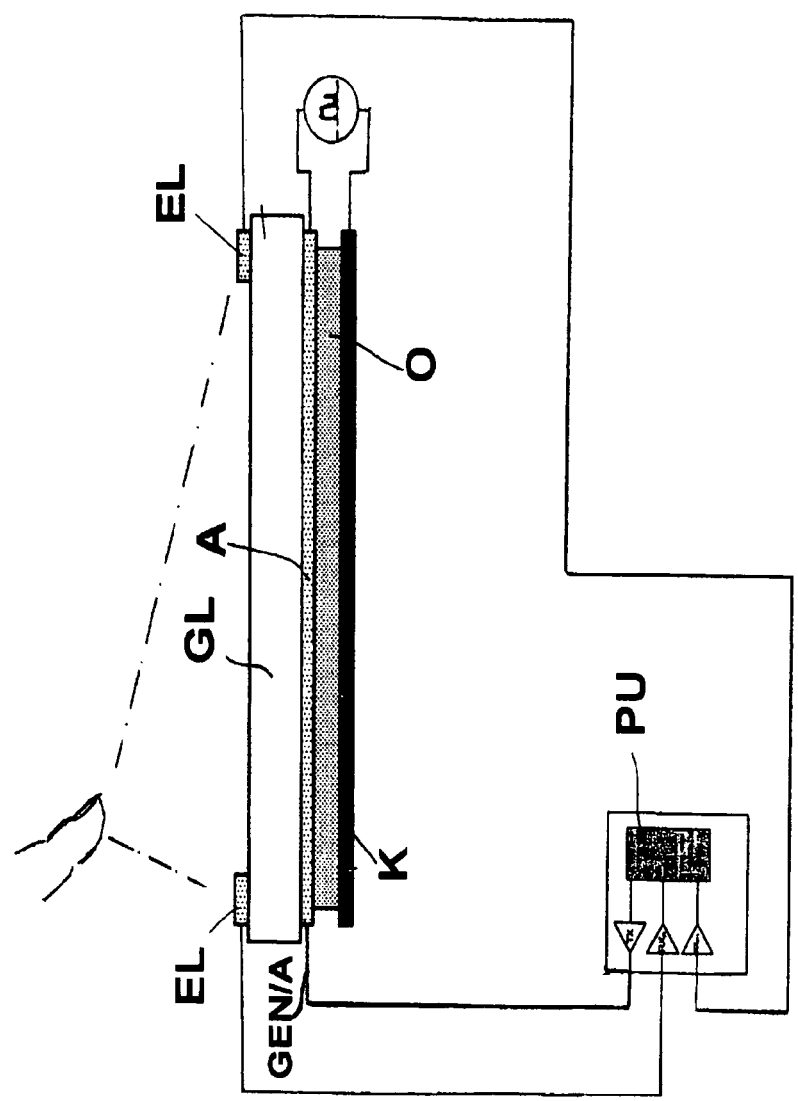
FIG. 7 shows a schematic view for illustrating the design of an illuminated position sensor device according to various embodiments incorporating an OLED structure.

FIG. 7 schematically and strongly simplified shows a cross-sectional view of an OLED interface according to various embodiments. It comprises a panel layer GL, an anode electrode layer A, a cathode electrode layer K, and an organic illuminant layer structure O, which is accommodated between the anode electrode layer A and the cathode electrode layer K.

The OLED interface further comprises an evaluation circuitry PU. The evaluation circuitry PU is configured such that in cooperation with at least the anode electrode layer A and/or the cathode electrode layer K (shown here is the variant with anode layer) a sensor system is implemented for detecting a finger F or a hand of a user in a region in front of the panel layer GL before and without, respectively, this user touches the OLED device or a panel element covering the OLED device.

By means of the assembly shown, as already described above, it becomes feasible to implement a user interface in connection with an OLED structure, which allows to detect the movement of a finger F or a hand of a user in a region located in front of the OLED structure by means of electrostatic and field electric effects, respectively, and in this connection to use the electrodes of the OLED structure. In the example shown here the voltage supply of the OLED structure is carried out by means of a square wave generator. By means of pulse width modulation the illuminating intensity may be adjusted. The operation of the OLED structure by alternating DC voltage allows for a particularly advantageous operation mode of the position sensor system implemented including the anode electrode A. This way, for example, the coupling-in of the potential, the capacitive coupling to ground, or the capacitive coupling against the potential of one of electrodes A, K of the OLED structure may be detected for each voltage cycle or for a selected number of voltage cycles. These levels are determined for the respective sensor electrode EL and are used for calculating the position of the finger.

Figure 8:
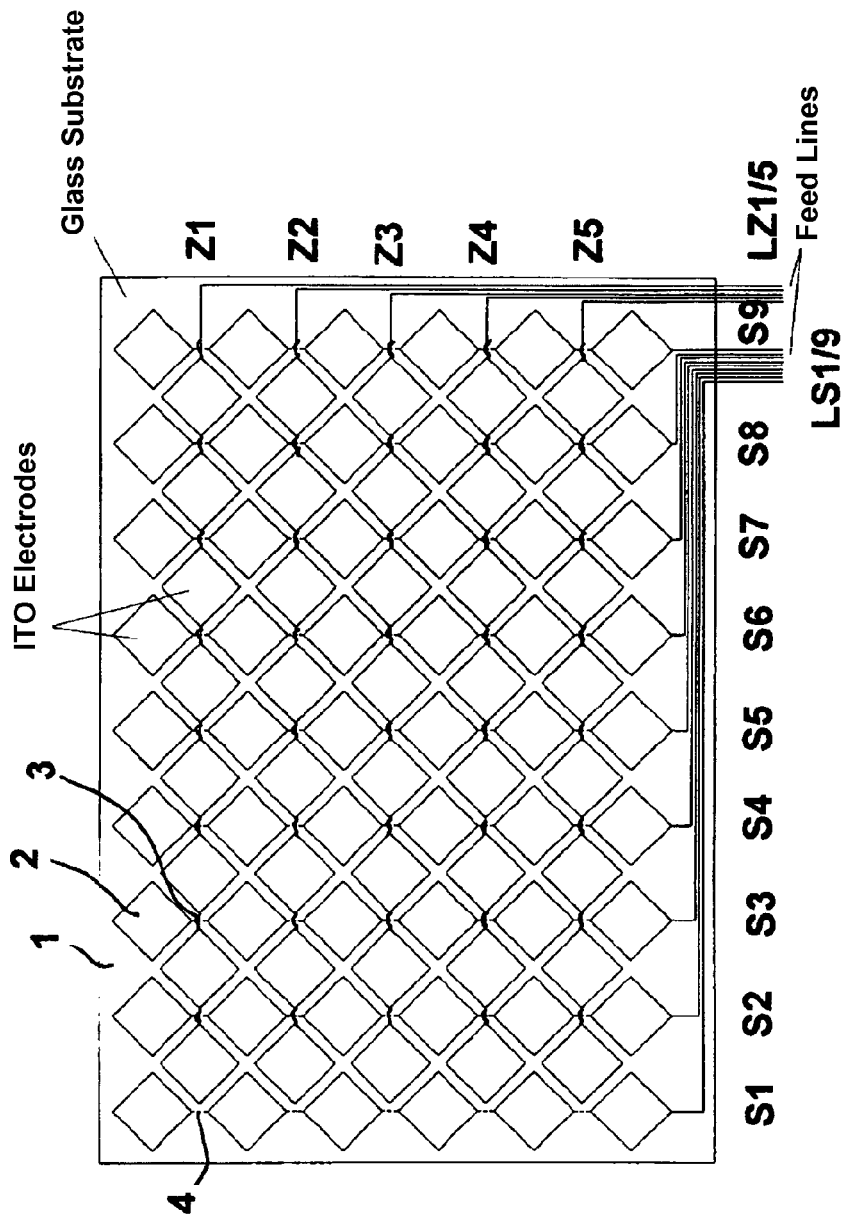
FIG. 8 shows a schematic view for illustrating the design of an illuminated input device implemented in connection with an OLED structure comprising electrode segments arranged array-like that are used for contact detection as well as also for finger position detection in the non-touch mode.

FIG. 8 strongly simplified shows a specific application case of the OLED interface technique according to various embodiments in a display device. This display device comprises a panel layer 1 that consists of a transparent and isolating material. Applied to this panel layer 1 is a transparent electrode layer, which is bound to the panel layer 1. This electrode layer is sub-divided into a plurality of electrode segments 2. The collective of all electrode segments 2 constitutes the segment array visible here. This segment array forms segment rows Z1, Z2, Z3, Z4 and Z5 as well as segment columns S1, S2 . . . S9 as the respective horizontal and vertical successive adjacent segments 2 are connected to each other by means of small connecting line segments 3, 4. The segment rows Z1 . . . Z5 and the segment columns S1 . . . S9 are isolated against each other and in each case are provided with a discrete feed line LZ1/5 and LS1/9 routed across the panel layer. The connecting line segments 3, 4—provided that they cross each other in the region of the display—also are isolated against each other.

Figure 9:
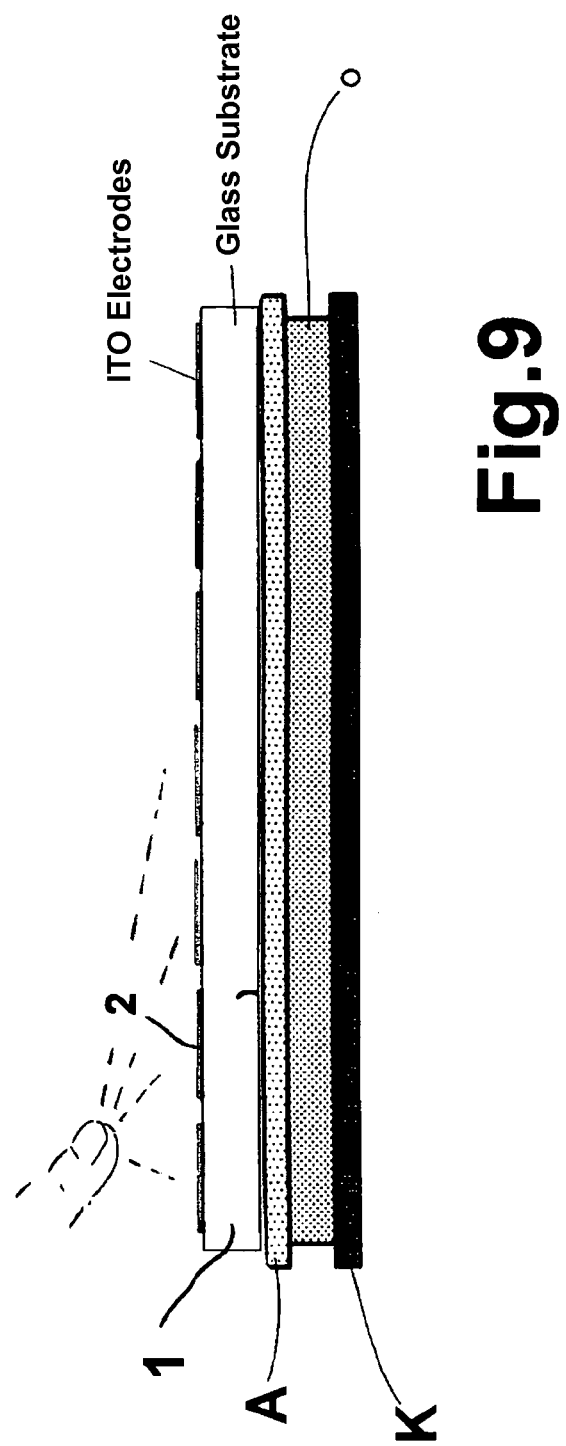
FIG. 9 shows a cross-sectional view for further illustration of the configuration of the illuminated input device of FIG. 7.

Via these feed lines LZ1/5 and LS1/9 the segment columns and segment rows are connected with an evaluation circuitry not shown in more detail here. This evaluation circuitry is configured such that it may take a first switching state, in which a contact detection is carried out via the electrode segments of the electrode layer, and may take a second switching state, in which the contactless position detection of a finger of the user in a region in front of the display device may be carried out, wherein the contactless position detection is carried out by combining several electrode segments 2 of the segment array into an electrode group, in particular electrode row Z1 . . . Z5 or electrode column S1 . . . S9. The electrode segments 2 or the electrode segment chains formed herefrom functionally substantially correspond to the sensor electrodes EL shown in FIG. 1. Depicted strongly simplified in FIG. 9 is the assembly of the OLED interface of FIG. 2. The panel layer 1 preferably consists of a plastic or glass material and has a thickness of, for example, 0.8 mm. Provided on the panel layer 1 on both sides each is a transparent conductive coating (for example ITO coating). One of these layers functions as electrode of the OLED structure O. Preferably, the anode electrode layer A is located between the electrode array comprising the electrode segments 2 and the cathode electrode layer.

The upper side facing the user in integrated and handling position has a structured layer that, in doing so, is subdivided into a plurality of segments 2, which in this connection comprise closely adjacent segments, for example rhombi, divided into rows and columns as shown in FIG. 8. The electric contacting of the electrode segments grouped into rows and columns is carried out by means of dedicated feed lines. The electrode functioning as anode electrode A of the OLED structure O is carried out as continuous transparent ITO layer. The panel structure constructed such forms a self-illuminating panel element that may function as a self-illuminating touchpad and as an interface for contactless input operations. The electrode layers are covered by further isolating transparent layers not shown here and thereby in particular may not directly be contacted from the side of the user galvanically.

Figure 10:
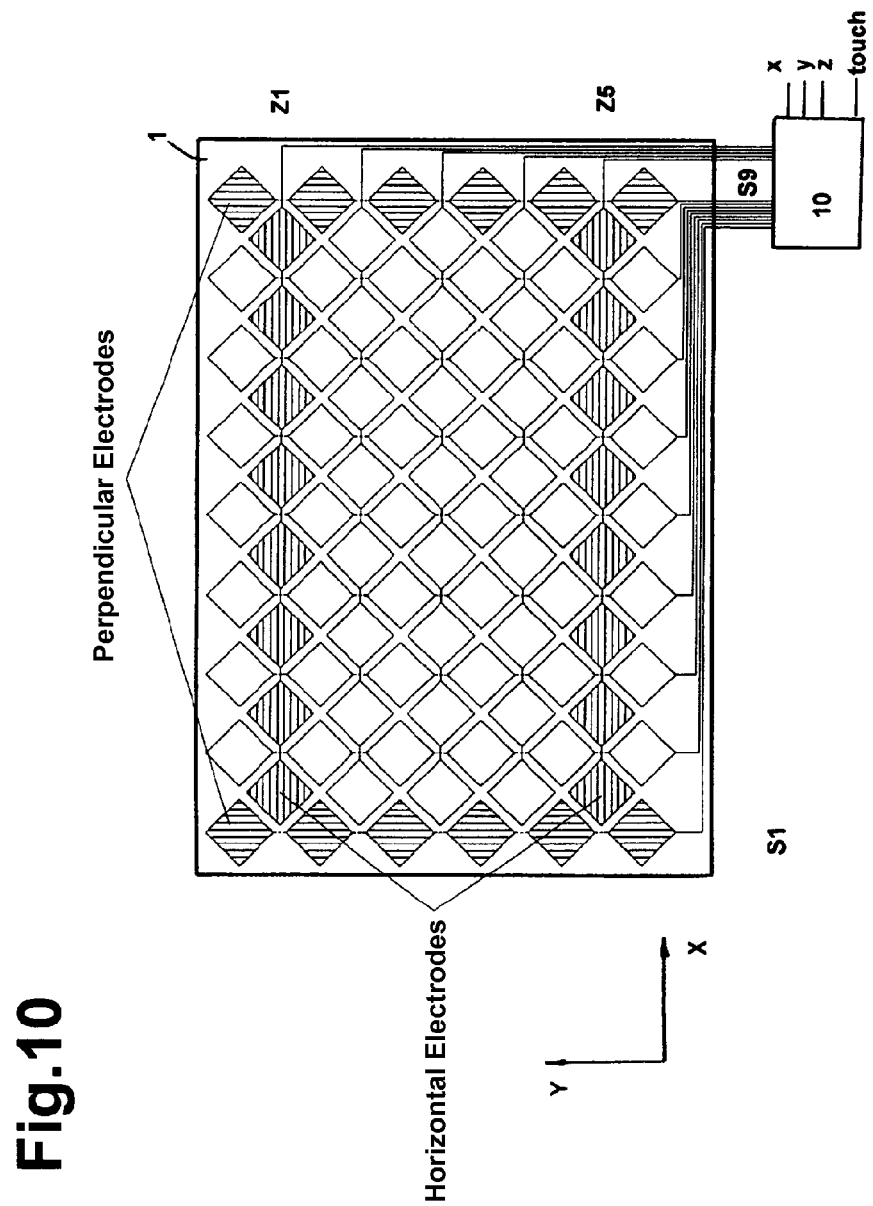
FIG. 10 shows a schematic view for illustrating the forming of two horizontal and two vertical electrode segment groups in an electrode segment array that temporarily are used as field electrodes for detecting a position of the finger.

As illustrated in FIG. 10 now in the exemplary embodiment shown here in a respective switching state four of the rhomb chains located close to the edge, i.e. the segment rows Z1 and Z5 formed by horizontal combination of electrode segments 2 as well as the segment columns S1 and S9 formed by vertical combination of the electrode segments 2 located close to the edge, are used for a finger position or finger movement detection on the glass. For this reason a "frame" gesture detection electrode is constructed by using the electrode segments grouped into rows and columns.

The upper horizontal electrode segment group Z1 and the lower horizontal electrode segment group Z5, as well as the two left and right electrode segment columns S1 and S9 located close to the edge that are used for finger position detection in the non-touch mode are highlighted by hatchures here. The two horizontal electrode segment groups Z1 and Z5 are used for detecting a y position of the finger of a user. Simultaneously with, or if applicable also immediately after the detection of the y position via these two electrode segment groups Z1 and Z5 an evaluation may be carried out by means of which via the electrode segment column S1 in the left edge region a left elongated detection electrode is formed (left vertical rhomb chain) and by means of connecting together the electrode segments in the right edge region a right electrode segment column S9 (right vertical rhomb chain) is formed. By means of these two electrode groups then the x position of the approached finger may be determined. Further, from the measurement signals the distance of the finger to the OLED interface may be determined. For determining the x and y positions also the signal levels detected by the row-like and column-like electrode segment groups may be determined on the basis of other evaluation approaches. In particular, also electrode segment groups aligned cross-wise with respect to each other may be used for the x and y position determination. For determining x and y positions different evaluation approaches may be used in a cumulative weighted manner.

In a device that is provided with a respective OLED interface the positioning of the hand or of a finger may be detected beginning with falling below a certain distance before the finger touches the OLED interface.

As soon as the finger of the user touches down on the OLED interface a well known touchpad function is presented using the electrode segments 2.

It is feasible to provide further electrodes in the region of the OLED interface, which, for example, only serve supporting the position detection in the "non-touch mode". By means of these additional electrodes, for example, the detection of the presence of a hand at a larger distance may be carried out.

A change to an operating mode in which the touch analysis electrodes are used as position detection electrodes for contactless position detection then, for example, only takes place when a certain minimum distance is undercut. The accomplishment of a position detection of fingers before these touch the OLED interface may be suppressed as soon as a contact with the OLED interface has been detected. Further, the evaluation of the electrode segments in the touch mode may be suppressed as long as a certain minimum distance not yet is undercut.

The finger position detection mode without contacting (non-touch or GestIC mode) and the finger position detection mode including interface contact (touch mode) each may be activated by a multiplexer, in particular a time multiplexer. The GestIC mode may include the use of a group driver for selecting the respective electrode group, wherein by means of that group driver it is determined, which electrode segment group, or if applicable even which individual electrode segments, momentarily are used for detecting the position of the finger in the non-touch mode. The group driver may forward the information about the momentary electrode segment group to a compensation circuitry that as such defines certain characteristics or presettings and reference level values, which are taken into account in the evaluation of the field electric phenomena detected by means of the respective electrode segment group. These characteristics in particular may describe the overall capacity or grounding of the momentarily active electrode system in the unaffected state and thereby cause certain pre-calibration.

The circuitry for temporary activation of the electrode segment rows and the electrode segment columns, as well as for the evaluation of the field electric environment stati detected by means of the activated electrode segment groups may be implemented in an advantageous manner in an ASIC 10, which preferably is arranged in direct vicinity of the panel layer 1, in particular is bound to the panel layer 1.

Preferably, this ASIC 10 is configured such that besides the detection of the position of the finger in the non-touch mode it also offers the evaluation in the touch mode, i.e. the touchscreen functionality. This ASIC 10 preferably is designed such that certain functions may be defined by programming. The ASIC may be designed such that it is defined by it, which electrode segment groups, in particular which electrode segment rows Z1 . . . Z5 and electrode segment columns S1 . . . S9 of the electrode segment array momentarily are used for the position detection in the non-touch mode.

The ASIC 10 itself provides the signals with respect to the x and y position as well as the touch state in the manner of common touchscreen circuitries. In addition, the ASIC 10 also provides the z position and signals, respectively, which provide conclusion for the distance of the finger of a user from the display before this is contacted. A background program may be processed in the ASIC that carries out a certain pre-evaluation of the detected position or movement information. This way, in particular also "mouse click information" may be generated by the ASIC. The ASIC 10 uses the electrode segments 2 provided for the x and y position detection in the touch mode and selects from these electrode segment groups Z1 . . . Z5 and S1 . . . S9 in certain intervals. These electrode segment groups Z1 . . . Z5 and S1 . . . S9 are connected to an evaluation system. By means of this evaluation system the distance, i.e. the z position of the finger or of the hand of a user from the OLED interface may be detected. In this connection, the detection is based on a variation of the capacitive coupling against ground, the coupling-in of a potential and/or the variation of the dielectric characteristics of the vicinity of the electrode groups as a result of the intrusion and positioning of the finger or of the hand into a region in front of the OLED interface. The influence on the dielectric characteristics of the vicinity of the electrode segment groups Z1 . . . Z5 and S1 . . . S9 by the user may be detected via different measurement approaches by means of the electrode groups temporarily operated as sensor electrodes. A typical measurement approach is, for example, that the coupling of the activated electrode segment group to ground influenced by the finger of the user is detected as an analog level varying within a range.

Figure 11:
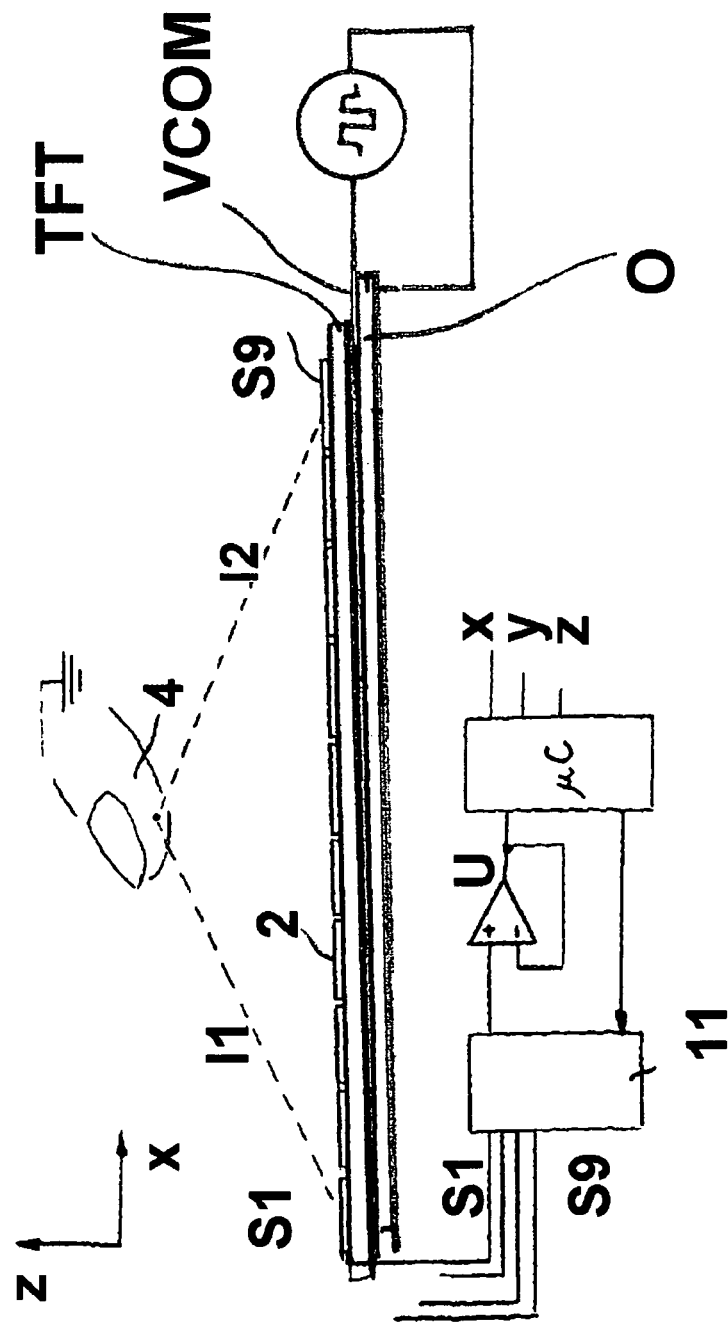
FIG. 11 shows a layout for illustrating the determination of a coordinate by means of trilateration of the voltage levels detected by means of the left and right segment columns.

Further depicted in FIG. 11 in the form of a drawing is an OLED interface according to various embodiments and the detection of the position of a finger of a user carried out therewith. By means of the electrode segments 2 located close to the edge and combined into segment columns S1 and S9 signal levels are detected, which are indicative for the distances I1, I2 of the fingertip 4 of the user from the OLED interface. From these signal levels then the x position and the z distance are calculated. The level detection is carried out via a group driver that successively connects certain electrode segment groups of the display device with an evaluation circuitry. The voltage level at the electrode group is detected highly-resistive via the amplifier depicted in a simplified manner and is fed to the μC. It comprises an ADC and calculates the x, y and z coordinates of the fingertip 4 from the digital level information such accomplished. The electrode segments 2 are located on a panel layer that forms a part of a TFT display structure. The TFT display structure comprises a VCOM electrode (VCOM) that directly functions as an anode electrode, or if applicable also as a cathode of the OLED structure O. The OLED structure O, the TFT structure TFT and the upper sensor electrode array have a layered design. The OLED structure O and the TFT structure TFT share one transparent electrode layer as VCOM electrode and as anode electrode, respectively, of the OLED structure. The TFT structure also may be implemented as a simple LCD structure.

Applied to the electrodes of the OLED structure O is an alternating voltage here without potential reversal described in a simplified manner as a square wave voltage. The circuitry device comprises Rx and Tx connections. It is feasible, for example by means of respective channel multiplexing, to use a plurality of electrode segment chains for contactless position determination. The evaluation of the signal levels present at the respective electrode segment chains in the non-touch mode may be carried out such that a multi object detection, i.e., for example, the detection of two fingertips, and a respective position detection are carried out.

Figure 12:
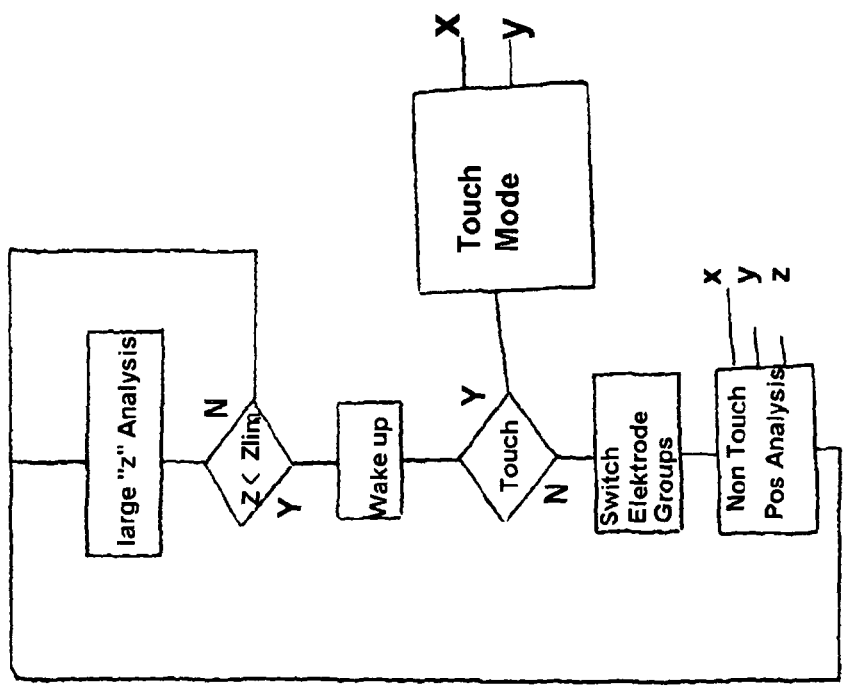
FIG. 12 shows a flowchart for describing a simplified variant of the position determination method according to various embodiments.

Depicted in FIG. 12 is a simplified flow diagram. As can be seen therefrom, initially it is checked whether a certain minimum distance from the OLED structure has been undercut. When this is true, the system is switched from a simple energy savings operation mode into a main operating state. When a state of contact is detected, a detection of the contact position is carried out by means of the electrode segment array. This touch mode is maintained so long until the contact is ended. As soon as the finger of the user rises from the OLED interface it is checked whether a certain distance threshold value of for example 66% of the interface surface diagonal not yet is exceeded. When this distance threshold value is not exceeded, the detection system operates in the non-touch mode in which successively activated electrode segment rows Z1 . . . Z5 and electrode segment columns S1 . . . S9, or only the electrode segment groups located close to the edge, i.e. the electrode segment rows Z1 and Z5, as well as the electrode segment columns S1 and S9 of the electrode segment array are evaluated with respect to their capacitive coupling to ground. The x, y and z positions of the finger may be calculated from the analog values depending on the momentary position of the finger.

The technique according to various embodiments may be implemented as an OLED panel element, which is provided with touchscreen electrodes, wherein these touchscreen electrodes are connected to an evaluation circuitry according to various embodiments. This panel element then may be integrated into a display. An isolating transparent cover layer on the side facing the user preferably additionally covers the electrodes of the panel element, so that as well in the touch mode no galvanic contacting of the electrode segments is carried out.

The technique according to various embodiments in particular qualifies fort mobile communications devices as for example cell phones, e-books and tablet-PCs.

The electrode segments of the electrode array may be integrated into a multi-layered transparent panel structure. In order to accomplish a particularly reliable isolation of the crossing bridging points between the individual electrode segments the electrode segments that in each case form electrode segment rows may be arranged on a first side of a transparent and isolating layer and the electrode segments that are connected to form electrode segment columns—therefore run cross-wise with respect to the rows—may be arranged on an opposite side of this layer or also on a further layer. Furthermore, on the side of this sandwich structure facing away from the user a back shielding layer substantially covering the whole surface may be configured. This back shielding layer in particular also may be formed by the so-called VCOM layer of a liquid crystal structure. This VCOM layer in turn preferably functions as electrode of the OLED structure.

The various embodiments primarily relate to an OLED interface that provides touchscreen functionalities as well as non-touch position analysis functionalities, wherein these functionalities are implemented by means of jointly used electrode segments. The concept according to various embodiments may also be copied to flat structures that do not directly cover a display. These flat structures may be used to implement at least temporarily illuminated touchpads, which in addition also allow for contactless position detection. Such touchpads may be incorporated at positions so far common to touchpads, for example in notebooks. The structure according to various embodiments for combined detection of finger positions in the touch mode as well as also in the non-touch mode also may be integrated into other devices, in particular furniture and vehicle passenger compartment equipment, in order to implement here in a spatially limited region a respective, temporarily illuminated input zone, i.e. an input zone that also allows for non-touch interactions.

The complexes described in the above description—usage of the VCOM electrode of the TFT display for gesture detection and usage of the anode electrode of an OLED structure for gesture detection—may be implemented in combination in a particularly advantageous manner. In this case the anode electrode of the OLED structure preferably functions as VCOM electrode of the TFT display structure. The layer structure such created then may be provided with a multi-segment electrode array, wherein preferably in turn a laminar electrode of the OLED structure functions as field providing electrode.

What is claimed is:

1. A liquid crystal (LC) display, comprising:
a first substrate layer,
a first electrode structure, which comprises a plurality of pixel electrodes and is applied to the first substrate layer,
a liquid crystal filling, and
a single second electrode structure that is designed as a whole area electrode layer and functions as a single counter electrode for the plurality of pixel electrodes,
wherein the LC display is provided with a sensor device comprising a plurality of sensor electrodes arranged in rows and columns for detecting in a touch mode a touch of a finger of a user and in a non-touch mode for detecting the finger or a hand of the user in a region located in front of the LC display thereby causing changes in an electric field, wherein each row and each column comprises a plurality of electrically connected sensor elements and wherein the sensor device is configured to operate in one of the touch mode and the non-touch mode,
wherein when the sensor device operates in the non-touch mode, the second electrode structure functions as the electric field providing electrode for the sensor device receiving an alternating voltage to generate said electric field and wherein at least one row of connected sensor elements and one column of connected sensor elements are selected to each operate as a receiving electrode, wherein signals from the at least one row of connected sensor elements and one column of connected sensor elements operating as a receiving electrodes are used to determine a three-dimensional position above said sensor device,
wherein the alternating voltage fed to the second electrode structure is approximately a square wave signal having a plurality of subsequent rising and falling edges and wherein signals received from the plurality of sensor electrodes are sampled, wherein sampling of the signals received from each sensor electrode is performed with two sampling points per rising and two sampling points per falling edge wherein a first sampling is performed immediately before occurrence of a rising edge or a falling edge and an immediately subsequent second sampling is performed immediately after occurrence of a rising edge or a falling edge and wherein each sampling is performed with a sampling time short enough that the signals received can be assumed to be quasi constant.

2. The LC display of claim 1, wherein the sensor device circuitry-wise at least partially is embedded into a display operating circuitry.

3. The LC display of claim 1, wherein four electrodes are selected which form a frame.

4. The LC display of claim 3, wherein the four electrodes comprise the most left and most right of the column electrodes and the most upper and most lower of the row electrodes.

5. The LC display of claim 1, wherein the display device is configured as a rectangular display, and wherein a top and bottom row of electrodes each form an elongated top and bottom electrode, respectively and a left and right column of electrodes each form an elongated left and right electrode, respectively.

6. The LC display of claim 1, wherein the alternating voltage is a square wave, trapezoidal or similar alternating voltage.

7. The LC display of claim 6, wherein the frequency of the square wave voltage is in the range of 50 Hz to 80 kHz.

8. The LC display of claim 1, wherein the sensor electrodes are designed transparent and are placed above the counter electrode.

9. The LC display of claim 1, further comprising circuitry for switching between the touch mode and the non-touch mode.

10. The LC display of claim 9, wherein the circuitry is provided by an application specific integrated circuit (ASIC).

11. The LC display according to claim 1, wherein the second electrode structure is the outermost electrically conductive layer of the LC display.

12. The LC display of claim 1, wherein the square wave signal has a frequency of about 10 kHz.

13. A sensor circuitry for detecting the presence and/or position of extremities in a region spatially located in front of a liquid crystal (LC) display, comprising:
several measurement electrodes,
an electric field-providing electrode receiving an alternating voltage for generating an electric field which takes effect onto the measurement electrodes in dependence of the presence or position of the above mentioned extremities, and
an evaluation circuitry for detecting field electric effects onto these measurement electrodes,
wherein the electric field-providing electrode is implemented using a VCOM electrode of the LC display, wherein the VCOM electrode is a single electrode substantially covering the LC display,
wherein in a first operating mode, the measurement electrodes are used to perform a touch detection by measuring a capacitance of a measurement electrode or of a capacitance between neighboring electrodes and wherein in a second operating mode some of the electrodes are selected to perform a non-touch detection by measuring variances in the electric field generated by the electric field-providing electrode, wherein signals from the selected measurement electrodes are used to determine a three-dimensional position above said sensor device, wherein the alternating voltage is approximately a square wave signal having a plurality of subsequent rising and falling edges and wherein subsequent signals received from the plurality of sensor electrodes are sampled immediately before and after each rising and falling edge and wherein each sampling is performed with a sampling time short enough that the signals received can be assumed to be quasi constant.

14. The sensor circuitry according to claim 13, wherein in the second mode four electrodes are selected forming a frame.

15. The sensor circuitry of claim 13, wherein the square wave signal has a frequency of about 10 kHz.

16. A method for detecting the spatial position of extremities in a detection range that extends in front of a thin film transistor (TFT) liquid crystal (LC) display comprising a touch screen with electrode segments arranged in rows and columns, wherein an electric field is generated by means of a field providing electrode receiving an alternating voltage and voltage levels are detected by means of measurement electrodes that are affected by the spatial position of the extremities to be detected, wherein as field providing electrode a single laminar electrode is used, which forms a component part of the LC system of the TFT LC displays and each measurement electrode is formed by selecting a row or column of electrode segments of the touch screen in series, wherein in a first operating mode, the measurement electrodes are used to perform a touch detection and wherein in a second operating mode four electrodes are selected to perform a non-touch detection, wherein signals from the four electrodes are used to determine a three-dimensional position above said sensor device, and wherein the alternating voltage is approximately a square wave signal having a plurality of subsequent rising and falling edges and wherein signals received from the plurality of sensor electrodes are sampled, wherein sampling of the signals received from each sensor electrode is performed with two sampling points per rising and two sampling points per falling edge wherein a first sampling is performed immediately before occurrence of a rising or falling edge and an immediate subsequent second sampling is performed immediately after occurrence of a rising or falling edge and wherein each sampling is performed with a sampling time short enough that the signals received can be assumed to be quasi constant.

17. The method of claim 16, wherein the TFT LC display is operated by a square wave alternating voltage applied to the laminar electrode.

18. The method of claim 16, wherein the voltage at the laminar electrode is in the range of 5V.

19. The method according to claim 16, wherein the touch and non-touch detection are in a sleep mode until a minimum distance to the LC display of the spatial position has been reached.

20. The method according to claim 19, wherein after said minimum distance has been reached the spatial position of extremities are determined until a touch of the LC display occurs whereupon the touch screen electrode segments operate in touch mode to determine an associated touch location.

21. The method according to claim 20, wherein as long as a touch is detected, the non-touch detection is deactivated.

22. The method according to claim 20, wherein touch detection is deactivated until a predetermined distance to a surface of the touch screen is undercut.

23. The method according to claim 16, wherein the field providing electrode structure of the TFT LC display is driven with an alternating voltage having a frequency in the range of 5 kHz to 40 kHz.

24. The method according to claim 16, wherein the field providing electrode structure is the outermost electrically conductive layer of the TFT LC display.

25. The method according to claim 16, wherein the field providing electrode is formed continuously and covers a complete display surface.

26. The method of claim 16, wherein the square wave signal has a frequency of about 10 kHz.

27. A liquid crystal (LC) display, comprising:

a first substrate layer, a first electrode structure, which comprises a plurality of pixel electrodes and is applied to the first substrate layer, a liquid crystal filling, and a second electrode structure that is designed as a whole area electrode layer and functions as a counter electrode for the plurality of pixel electrodes, wherein the LC display is provided with a sensor device comprising a plurality of sensor electrodes which in a non-touch mode are configured to detect the finger or a hand of the user in a region located in front of the LC display thereby causing changes in an electric field, wherein the second electrode structure functions as the electric field providing electrode for the sensor device receiving an alternating voltage to generate said electric field, wherein the alternating voltage is approximately a square wave signal having a plurality of subsequent rising and falling edges and wherein signals received from the plurality of sensor electrodes are sampled, wherein sampling of the signals received from each sensor electrode is performed with only two sampling points per rising and with only two sampling points per falling edge wherein a first sampling is performed immediately before occurrence of a rising or falling edge and a second sampling is performed immediately after occurrence of a rising or falling edge and wherein each sampling is performed with a sampling time short enough that the signals received can be assumed to be quasi constant.

28. The LC display according to claim 27, wherein the second electrode structure of the LC display is driven with an alternating voltage having a frequency in the range of 5 kHz to 40 kHz.

29. The LC display according to claim 27, wherein the second electrode structure is the outermost electrically conductive layer of the LC display.

30. The LC display according to claim 29, wherein the second electrode is formed continuously and covers a complete display surface.

31. The LC display of claim 27, wherein the square wave signal has a frequency of about 10 kHz.

* * * * *